United States Patent
Sato et al.

(10) Patent No.: US 9,211,640 B2
(45) Date of Patent: Dec. 15, 2015

(54) TEACHING DEVICE FOR ROBOT, ROBOT APPARATUS, METHOD OF CONTROLLING TEACHING DEVICE FOR ROBOT, AND CONTROL PROGRAM OF TEACHING DEVICE FOR ROBOT

(71) Applicant: Panasonic Corporation, Osaka (JP)

(72) Inventors: Taichi Sato, Kyoto (JP); Yudai Fudaba, Osaka (JP); Yuko Tsusaka, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 46 days.

(21) Appl. No.: 14/144,969

(22) Filed: Dec. 31, 2013

(65) Prior Publication Data

US 2014/0114477 A1    Apr. 24, 2014

Related U.S. Application Data

(63) Continuation of application No. PCT/JP2012/007504, filed on Nov. 21, 2012.

(30) Foreign Application Priority Data

Nov. 30, 2011    (JP) .................................. 2011-262048

(51) Int. Cl.
    *G05B 19/18*    (2006.01)
    *B25J 9/00*     (2006.01)
    (Continued)

(52) U.S. Cl.
    CPC .............. *B25J 9/0081* (2013.01); *B25J 9/1664* (2013.01); *B25J 9/1687* (2013.01); *G05B 19/423* (2013.01);
    (Continued)

(58) Field of Classification Search
    CPC ...... B25J 9/0081; B25J 9/1664; B25J 9/1687; G05B 19/423; G05B 2219/39469; G05B 2219/40028; G05B 2219/40052
    USPC .................................. 700/245, 248, 250, 252
    See application file for complete search history.

(56) References Cited

U.S. PATENT DOCUMENTS

2006/0271240 A1\*  11/2006  Nihei ...................... B25J 9/1664
                                                                700/245
2011/0153076 A1\*   6/2011  Noro ...................... B25J 9/1687
                                                                700/245

FOREIGN PATENT DOCUMENTS

JP          6-262563        9/1994
JP          7-9368          1/1995
            (Continued)

OTHER PUBLICATIONS

International Search Report (ISR) issued Mar. 5, 2013 in International (PCT) Application No. PCT/JP2012/007504.
(Continued)

*Primary Examiner* — Ian Jen
(74) *Attorney, Agent, or Firm* — Wenderoth, Lind & Ponack, L.L.P.

(57) ABSTRACT

In a teaching device for robot that moves a flexible body holding unit holding a flexible body and performs teaching of a fitting task of the flexible body to a thing to generate teaching data, a reaching decision unit decides that a front end of the flexible body reaches the thing, a curvature acquiring unit acquires information of evaluation of a degree of curvature of the flexible body when the reaching decision unit decides the reaching, and a notification unit performs predetermined notification about teaching on the basis of the acquired information of evaluation.

21 Claims, 22 Drawing Sheets

(51) Int. Cl.
  *B25J 9/16* (2006.01)
  *G05B 19/423* (2006.01)

(52) U.S. Cl.
  CPC .......... *G05B 2219/39469* (2013.01); *G05B 2219/40028* (2013.01); *G05B 2219/40052* (2013.01); *Y10S 901/03* (2013.01)

(56) References Cited

FOREIGN PATENT DOCUMENTS

| JP | 8-95620 | 4/1996 |
| JP | 8-174457 | 7/1996 |
| JP | 8-174458 | 7/1996 |
| JP | 2006-331188 | 12/2006 |
| JP | 2009-50921 | 3/2009 |
| JP | 2010-58242 | 3/2010 |
| JP | 2011-131300 | 7/2011 |
| WO | 2011/021375 | 2/2011 |

OTHER PUBLICATIONS

Riichiro Damoto et al., "Development of Holonomic Omnidirectional Vehicle 'Vuton-II' with Omni-Discs", Journal of Robotics and Mechatronics, vol. 14, No. 2, pp. 186-192, 2002.

Jun Tang et al., "Autonomous Control for an Omnidirectional Mobile Robot with the Orthogonal-Wheel Assembly", Journal of Robotics Society of Japan, vol. 17, No. 1, pp. 51-60, 1991.

English translations of the International Preliminary Report on Patentability and Written Opinion (Form PCT/IB/338) issued Jun. 12, 2014 in International (PCT) Application No. PCT/JP2012/007504.

Chinese Office Action and Search Report issued Apr. 28, 2015 in corresponding Chinese Application No. 201280021289.4 (with partial English translation).

\* cited by examiner

Fig.2

| NUMBER OF TIMES | TRAJECTORY DATA |
|---|---|
| 1 | (x1_0,y1_0,z1_0,rx1_0,ry1_0,rz1_0), (x1_1,y1_1,z1_1,rx1_1,ry1_1,rz1_1),... |
| 2 | (x2_0,y2_0,z2_0,rx2_0,ry2_0,rz2_0), (x2_1,y2_1,z2_1,rx2_1,ry2_1,rz2_1),... |
| ... | ... |
| n | (xn_0,yn_0,zn_0,rxn_0,ryn_0,rzn_0), (xn_1,yn_1,zn_1,rxn_1,ryn_1,rzn_1),... |

Fig.5A
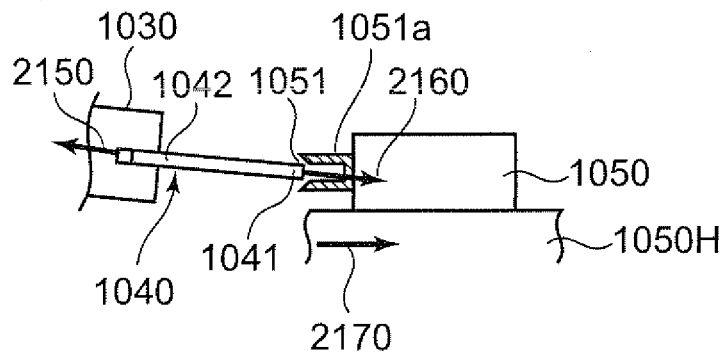
Fig.5B
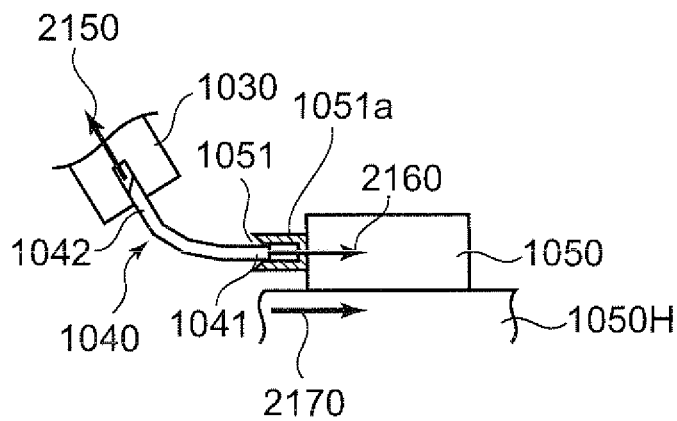
Fig.6
| DEGREE OF CURVATURE | SUCCESS RATE (%) |
|---|---|
| 10.9 | 0 |
| 11.2 | 60 |
| 11.5 | 80 |

Fig.8
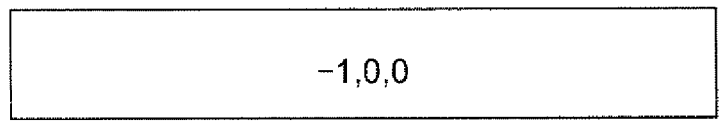
Fig.9
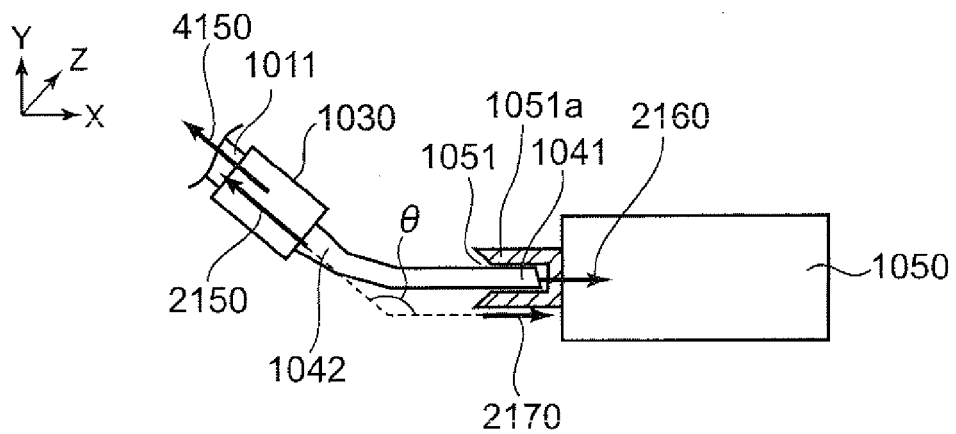
Fig.10
| D1 | V1 |
|---|---|
| 1 | 17.3 |
| 2 | 18.0 |
| 3 | 18.4 |
| 4 | 17.2 |
| 5 | 17.8 |
| 6 | 16.5 |

Fig.11

BEST 3 EVALUATIONS OF DEGREES OF CURVATURE

| FIRST PLACE | SECOND PLACE | THIRD PLACE |
|---|---|---|
| THIRD TIME | SECOND TIME | FIFTH TIME |
| 18.4 | 18.0 | 17.8 |

THIS TIME 16.5

~ 2060s

TEACHING DEVICE FOR ROBOT, ROBOT APPARATUS, METHOD OF CONTROLLING TEACHING DEVICE FOR ROBOT, AND CONTROL PROGRAM OF TEACHING DEVICE FOR ROBOT

CROSS-REFERENCE TO RELATED APPLICATIONS

This is a continuation application of International Application No. PCT/JP2012/007504, with an international filing date of Nov. 21, 2012, which claims priority of Japanese Patent Application No.: 2011-262048 filed on Nov. 30, 2011, the content of which is incorporated herein by reference.

TECHNICAL FIELD

The technical field relates to a teaching device for robot, a robot apparatus, a method of controlling a teaching device for robot, and a control program of a teaching device for robot each of which performs a task or the like to insert one end of a flexible body into a thing (object).

BACKGROUND ART

When a conventional assembly task of a thing by using a robot arm, movement trajectory information of the robot arm is generated in advance (this is called teaching), and the robot arm reproduces the movement on the trajectory to repeat the task. The assembly task targeting a rigid body is rarely failed in the repetitive assembly task.

However, when the method is used in the assembly task targeting a flexible body, the task may be failed. Since flexible bodies have individual differences in manufacturing steps, collide with the thing after manufacturing, or are deformed by their own weights, the failure of the task occurs because a fluctuation of shape or orientation is larger in a flexible body than that in a rigid body.

Patent Literature 1 discloses a method in which a force sensor is fixed to the wrist of an assembly robot arm, values of forces at respective times in a teaching state are acquired, and the robot arm is moved to reproduce the values of the acquired forces in a replay state.

CITATION LIST

Patent Literature

Patent Literature 1: JP 8-174458 A

Non-Patent Literatures

Non-Patent Literature 1: R. Damoto and S. Hirose, "Development of Holonomic Omnidirectinal Vehicle "Vuton-II" with Omni-Discs", Journal of Robotics and Mechatronics, Vol. 14, No. 2, pp. 186-192, 2002
Non-Patent Literature 2: Autonomous Control for an Omnidirectional Mobile Robot with the Orthogonal-Wheel Assembly. Author: Jun Tang; Keigo Watanabe; Katsutoshi Kuribayashi; and Yamato Shiraishi, Journal of the Robotics Society of Japan, Vol. 17, No. 1, pp. 51-60, (1991)

SUMMARY OF THE INVENTION

However, in some cases, even though the method described above is used, an assembly task or the like for a flexible body may not be successful.

One non-limiting and exemplary embodiment provides a teaching device for robot, a robot apparatus, a method of controlling a teaching device for robot, and a control program of a teaching device for robot, to be able to perform an accurate insertion task of a flexible body, which is difficult in the conventionally technique.

In one general aspect, the techniques disclosed here feature: a teaching device for robot comprising a flexible body holding unit capable of holding a flexible body and a drive unit that moves the flexible body holding unit in a predetermined direction to perform a fitting task of the flexible body to a thing, in which teaching data are generated through teaching of the task, the teaching device comprising:

a reaching decision unit that decides that a front end of the flexible body reaches the thing;

a curvature acquiring unit that acquires information of evaluation of a degree of curvature of the flexible body when the reaching decision unit decides that the front end of the flexible body reaches the thing; and a notification unit that performs notification about teaching based on the information of evaluation acquired by the curvature acquiring unit.

These general and specific aspects may be implemented using a system, a method, and a computer program, and any combination of systems, methods, and computer programs.

EFFECTS OF THE INVENTION

According to the above aspect of the techniques, for example, when the flexible body reaches an insertion opening, when teaching is performed to perform insertion control after a task of bending the flexible body is performed, the curvature acquiring unit acquires evaluation information of a degree of curvature of the flexible body. On the basis of the evaluation information of the degree of curvature acquired by the curvature acquiring unit, when the flexible body reaches the insertion opening, it is decided whether teaching data obtained by teaching satisfies teaching to insert the flexible body after the task of bending the flexible body, and, on the basis of the evaluation information acquired by the curvature acquiring unit, the notification unit can give a predetermined notice about the teaching. In place of the notice, on the basis of the evaluation information acquired by the curvature acquiring unit, the selecting unit can select teaching having the high evaluation from plurality of teaching data. As a result, the teaching having a higher evaluation can be used, and teaching data by which a handling task of a flexible body can be accurately performed can be acquired, and a task such as an inserting task of a flexible body that is difficult in the conventional technique can be accurately performed.

BRIEF DESCRIPTION OF THE DRAWINGS

These and other aspects and features of the present disclosure will become clear from the following description taken in conjunction with the embodiments thereof with reference to the accompanying drawings, in which:

FIG. 2 is a table-format view showing trajectory data held by a trajectory information holding unit;

FIG. 5A is a view showing a direction of a first end of a flexible body and a degree of curvature of the flexible body to explain the object of the present disclosure;

FIG. 5B is a view showing the direction of the first end of the flexible body and the degree of curvature of the flexible body to explain the object of the present disclosure;

FIG. 6 is a table-format view showing evaluations of degrees of curvature of a flexible body in a teaching state and success probabilities of insertion when replay is performed 20 times by using a plurality of teaching data;

FIG. 8 is a view showing an example of information of a direction of a hole of an insertion opening held by a curvature reference holding unit of the robot apparatus according to the first embodiment of the present disclosure;

FIG. 9 is a view showing a direction of an arm tip and a direction of a first end in the robot apparatus according to the first embodiment of the present disclosure;

FIG. 10 is a table-format view showing an example of evaluation information held by an evaluation holding unit in the robot apparatus according to the first embodiment of the present disclosure;

FIG. 11 is a table-format view showing notice contents displayed on a notification unit in the robot apparatus according to the first embodiment of the present disclosure;

MODES FOR CARRYING OUT THE INVENTION

Figure 1:
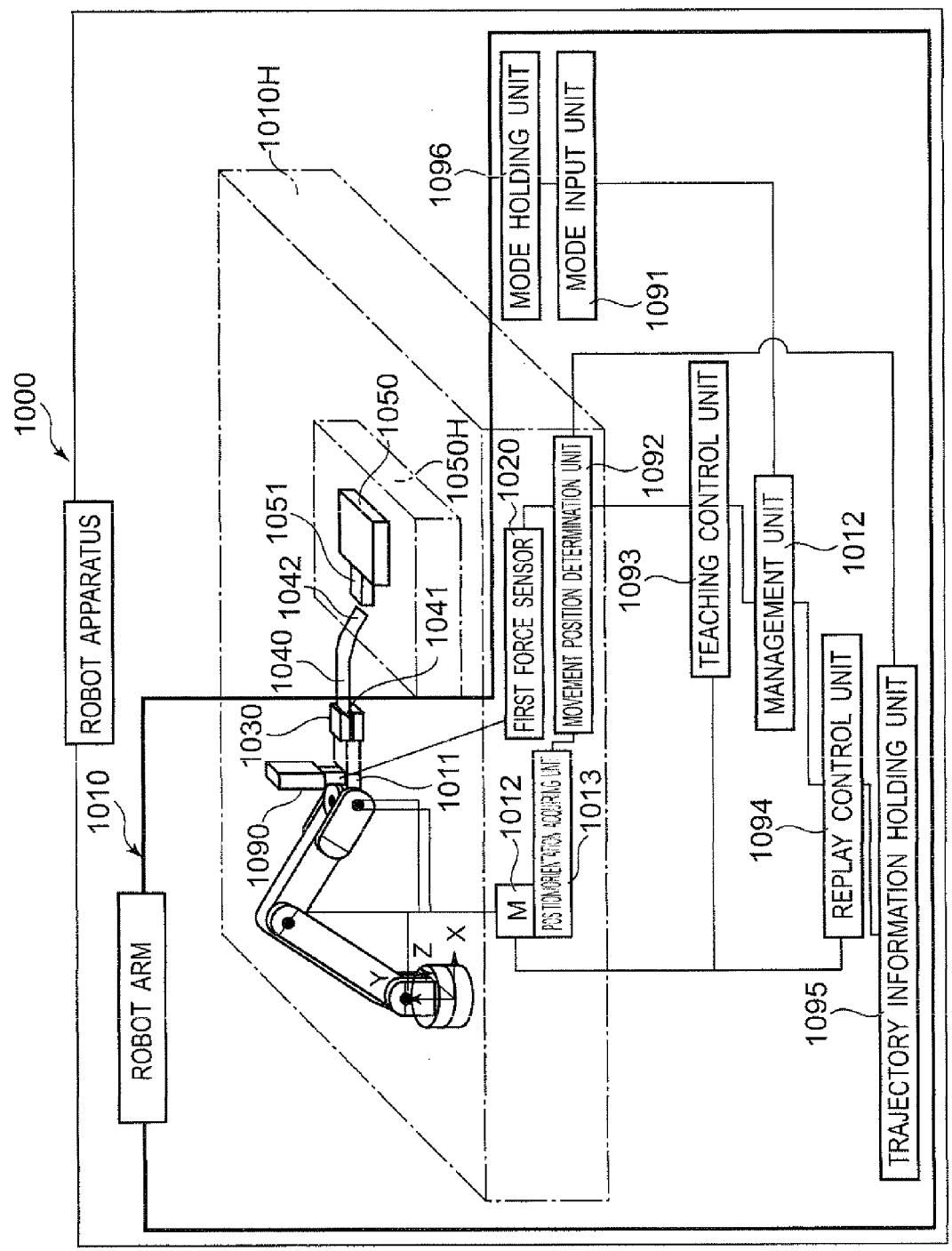
FIG. 1 is a view showing a robot apparatus in a configuration of direct teaching to explain the object of the present disclosure.

Examples of the disclosed technique are as follows.

1st aspect: A teaching device for robot comprising a flexible body holding unit capable of holding a flexible body and a drive unit that moves the flexible body holding unit in a predetermined direction to perform a fitting task of the flexible body to a thing, in which teaching data are generated through teaching of the task, the teaching device comprising:

a reaching decision unit that decides that a front end of the flexible body reaches the thing;

a curvature acquiring unit that acquires information of evaluation of a degree of curvature of the flexible body when the reaching decision unit decides that the front end of the flexible body reaches the thing; and a notification unit that performs notification about teaching based on the information of evaluation acquired by the curvature acquiring unit.

2nd aspect: The teaching device for robot according to the 1st aspect, wherein the notification unit performs notification to more sharply bend the flexible body.

3rd aspect: A teaching device for robot comprising a flexible body holding unit capable of holding a flexible body and a drive unit that moves the flexible body holding unit in a predetermined direction to perform a fitting task of the flexible body to a thing, in which teaching data are generated through teaching of the task, comprising:

a reaching decision unit that decides that a front end of the flexible body reaches the thing;

a curvature acquiring unit that acquires information of evaluation of a degree of curvature of the flexible body when the reaching decision unit decides that the front end of the flexible body reaches the thing; and a selecting unit that selects teaching data having the high evaluation from a plurality of teaching data based on the information of evaluation acquired by the curvature acquiring unit.

4th aspect: The teaching device for robot according to the 3rd aspect, wherein, when the teaching data having the high evaluation is selected, the selecting unit selects an evaluation better than other evaluations as the evaluation of the degree of curvature of the flexible body.

5th aspect: The teaching device for robot according to any one of the 1st to 4th aspects, wherein the curvature acquiring unit acquires the information of evaluation of the degree of curvature based on an angle between directions of the flexible body at two points of the flexible body.

6th aspect: The teaching device for robot according to any one of the 1st to 5th aspects, comprising:

a curvature reference holding unit that stores information of a direction of a hole of an insertion opening of the thing in fitting of the flexible body to the thing; and a position/orientation acquiring unit that acquires information of a direction of the flexible body at one point, wherein the curvature acquiring unit acquires the information of evaluation based on the information of the direction of the hole of the insertion opening stored in the curvature reference holding unit and the information of the direction of the flexible body at one point acquired by the position/orientation acquiring unit.

7th aspect: The teaching device for robot according to any one of the 1st to 6th aspects, comprising a force sensor that acquires a force acting on the flexible body, wherein the reaching decision unit performs the decision based on the force acquired by the force sensor.

8th aspect: The teaching device for robot according to the 5th aspect, further comprising:

a photographing device that photographs the flexible body; and a position acquiring unit that performs image processing to an image photographed by the photographing device to acquires positions of the two points on the flexible body, wherein the curvature acquiring unit, based on the positions of the plurality of points acquired by the position acquiring unit, acquires a direction of the flexible body at at least one point on the flexible body to acquire the information of evaluation of the degree of curvature of the flexible body based on the acquired direction of the flexible body.

9th aspect: The teaching device for robot according to any one of the 1st to 6th aspects, further comprising:

a photographing device that photographs the flexible body; and a characteristic point extracting unit that performs image processing to an image photographed by the photographing device to extract the front end of the flexible body based on a characteristic point of the front end of the flexible body, wherein the reaching decision unit decides the reaching depending whether the characteristic point extracting unit extracts the front end of the flexible body.

10th aspect: The teaching device for robot according to the 1st or 2nd aspect, further comprising an evaluation holding unit that holds the information of evaluation acquired by the curvature acquiring unit when teaching of the task is performed a plurality of times and the reaching decision unit decides reaching in each of the teaching states, wherein the notification unit notifies of a first predetermined number of larger evaluated values or a variance of the first predetermined number of evaluated values of information of a plurality of evaluations held by the evaluation holding unit.

11th aspect: The teaching device for robot according to any one of the 1st to 10th aspects, further comprising:

an evaluation holding unit that holds the information of evaluation acquired by the curvature acquiring unit when teaching of the task is performed a plurality of times and the reaching decision unit decides reaching in each of the teaching states; and a teaching decision unit that decides whether teaching is continued based on evaluated values of a predetermined number of larger evaluated values of information of a plurality of evaluations held by the evaluation holding unit.

12th aspect: The teaching device for robot according to any one of the 1st to 10th aspects, wherein the robot is a robot arm, and the drive unit is a joint drive unit that drives joint portions of the robot arm.

13th aspect: A robot apparatus comprising:

the teaching device for robot according to any one of the 1st to 11th aspects; and a replay control unit that replays with the robot a trajectory taught by the teaching device.

14th aspect: A robot apparatus comprising:

the teaching device for robot according to claim 1, the teaching device further comprising an evaluation holding unit that holds the information of evaluation acquired by the curvature acquiring unit when teaching of the task is performed a plurality of times and the reaching decision unit decides reaching in each of the teaching states; and a replay control unit that replay with the robot a trajectory taught by the teaching device, wherein the replay control unit replays teaching data generated when teaching having a large evaluated value is performed in information of a plurality of evaluations held by the evaluation holding unit.

15th aspect: A robot apparatus comprising:

the teaching device for robot according to claim 1, the teaching device further comprising an evaluation holding unit that holds the information of evaluation acquired by the curvature acquiring unit when teaching of the task is performed a plurality of times and the reaching decision unit decides reaching in each of the teaching states; and a replay control unit that replay with the robot a trajectory taught by the teaching device, wherein the replay control unit replays teaching data generated by averaging a predetermined number of teaching data having larger evaluated values in information of a plurality of evaluations held by the evaluation holding unit.

16th aspect: A method of controlling a teaching device for robot comprising a flexible body holding unit capable of holding a flexible body, and a drive unit that moves the flexible body holding unit in a predetermined direction to perform a fitting task of the flexible body to a thing, in which teaching data are generated through teaching of the task, the method comprising:

causing a reaching decision unit to decide that a front end of the flexible body reaches the thing;

causing a curvature acquiring unit to acquire information of evaluation of a degree of curvature of the flexible body when the reaching decision unit decides that the front end of the flexible body reaches the thing; and causing a notification unit to perform predetermined notification about teaching based on the information of evaluation acquired by the curvature acquiring unit.

17th aspect: A method of controlling a teaching device for robot comprising a flexible body holding unit capable of holding a flexible body, and a drive unit that moves the flexible body holding unit in a predetermined direction to perform a fitting task of the flexible body to a thing, in which teaching data are generated through teach of the task, the method comprising:

causing a reaching decision unit to decide that a front end of the flexible body reaches the thing;

causing a curvature acquiring unit to acquire information of evaluation of a degree of curvature of the flexible body when the reaching decision unit decides that the front end of the flexible body reaches the thing; and causing a selecting unit to select the teaching having a high evaluation from a plurality of teaching data based on the information of evaluation acquired by the curvature acquiring unit.

18th aspect: A computer-readable recording medium including a control program of a teaching device for robot comprising a flexible body holding unit capable of holding a flexible body, and a drive unit that moves the flexible body holding unit in a predetermined direction to perform a fitting task of the flexible body to a thing, in which teaching data are generated through teaching of the task, the control program causing a computer to function as:

a reaching decision unit that decides that a front end of the flexible body reaches the thing;

a curvature acquiring unit that acquires information of evaluation of a degree of curvature of the flexible body when the reaching decision unit decides that the front end of the flexible body reaches the thing; and a notification unit that performs notification about teaching based on the information of evaluation acquired by the curvature acquiring unit.

19th aspect: A computer-readable recording medium including a control program of a teaching device for robot comprising a flexible body holding unit capable of holding a flexible body, and a drive unit that moves the flexible body holding unit in a predetermined direction to perform a fitting task of the flexible body to a thing, in which teaching data are generated through teaching of the task, the control program causing a computer to function as:

a reaching decision unit that decides that a front end of the flexible body reaches the thing;

a curvature acquiring unit that acquires information of evaluation of a degree of curvature of the flexible body when the reaching decision unit decides that the front end of the flexible body reaches the thing; and a selecting unit that selects teaching data having high evaluation from a plurality of teaching data based on the information of evaluation acquired by the curvature acquiring unit.

20th aspect: A teaching device for robot comprising a flexible body holding unit capable of holding a flexible body, and a drive unit that moves the flexible body holding unit in a predetermined direction to perform a fitting task of the flexible body to a thing, in which teaching data are generated through teaching of the task, the device comprising:

a reaching decision unit that decides that a front end of the flexible body reaches the thing;

an orientation acquiring unit that acquires an orientation of the flexible body holding unit;

a curvature acquiring unit that acquires an angle between a direction of the orientation acquired by the orientation acquiring unit and a predetermined direction determined in advance; and a notification unit that performs notification about teaching based on the angle acquired by the curvature acquiring unit.

21th aspect: A teaching device for robot comprising a flexible body holding unit capable of holding a flexible body and a drive unit that moves the flexible body holding unit in a predetermined direction to perform a fitting task of the flexible body to a thing, in which teaching data are generated through teaching of the task, the device comprising:

an orientation acquiring unit that acquires an orientation of the flexible body holding unit;

a curvature acquiring unit that acquires an angle between a direction of the orientation acquired by the orientation acquiring unit and a predetermined direction determined in advance; and a selecting unit that selects teaching data having high evaluation from a plurality of teaching based on the angle acquired by the curvature acquiring unit.

<Concretization of Object>

Prior to explanations of embodiments of the present disclosure, an object (an issue to be removed) posed when teaching and replaying a fitting task of inserting a flexible body into a thing (an object) will be described in more detail. Here, a configuration in which teaching is performed is explained by using direct teaching serving as one of teaching methods as an example, and then, the object posed when a flexible body is inserted into a thing in this configuration is described.

<Configuration of Direct Teaching>

Direct teaching is a teaching method in which a manipulator touches a robot arm to directly move the robot arm, a trajectory of movement of the robot arm is acquired at that time, and the robot arm is moved on the basis of the acquired trajectory of movement when the task is reproduced. Acquisition of a trajectory is called teaching, and the movement of a robot arm based on the taught trajectory is called replay.

FIG. 1 is a view showing a configuration of a robot apparatus 1000 that performs direct teaching. The robot apparatus 1000 shows a case in which a task of, by using a robot arm 1010, inserting a second end 1042 of a flexible body 1040 gripped by the robot arm 1010 into an insertion opening 1051 of a cylindrical insertion portion (peripheral portion) 1051a fixed to a thing 1050 held on a thing placing table 1050H fixed to an installation floor 1010H on which the robot arm 1010 is installed is taught and replayed.

The robot arm 1010 moves in 6 axial directions in an X-Y-Z coordinate space.

A hand (fixing portion) 1030 functioning as an example of a flexible body holding unit that holds the flexible body 1040 serving as an example of an object to be subjected to a task is provided at an end of an arm tip 1011 of the robot arm 1010 to hold and fix the object 1040.

A first force sensor 1020 is fixed to the arm tip 1011 of the robot arm 1010 to acquire a force acting on the following operation portion 1090 by the manipulator.

The operation portion 1090 is fixed to the first force sensor 1020 and gripped with a hand of the manipulator when teaching is performed by using the robot apparatus 1000. The manipulator grips the operation portion 1090 with her/his hand and applies a force in a direction in which the manipulator wants to move the arm tip 1011 of the robot arm 1010.

A position/orientation acquiring unit 1013 functions as an example of an orientation acquiring unit to acquire a position and an orientation (direction) (position and orientation of a hand (flexible body holding unit) 1030) of the arm tip 1011 of the robot arm 1010. For this reason, from an encoder 912E attached to a motor 912M serving as an example of a joint drive unit or drive unit attached to each of joint portions of the robot arm 1010, information of an angle of each of the joint portions acquired by the encoder 912E is input to the position/orientation acquiring unit 1013. On the basis of the angle of each of the joints acquired by the encoder 912E in the position/orientation acquiring unit 1013 and information of length of each link measured and stored in a built-in storage unit of the encoder 912E in advance, a position and an orientation of the arm tip 1011 are calculated by the position/orientation acquiring unit 1013.

Information of a force acquired by the first force sensor 1020 is input to a movement position determination unit 1092. More specifically, a force applied to the operation portion 1090 by the manipulator is acquired by the first force sensor 1020, and on the basis of the information of the force acquired by the first force sensor 1020, a position to which the arm tip 1011 is moved is determined by the movement position determination unit 1092.

Specifically, in the movement position determination unit 1092, a direction in which the arm tip 1011 is moved is determined on the basis of a direction of a force (force acquired by the first force sensor 1020) applied to the operation portion 1090 by the manipulator. For example, when the manipulator applies a force to the operation portion 1090 in +X direction (right direction in FIG. 1) in FIG. 1, the movement position determination unit 1092 determines a moving direction of the arm tip 1011 as the +X direction.

A moving distance or a moving speed of the arm tip 1011 is determined by the movement position determination unit 1092 on the basis of the magnitude of a force applied by the manipulator. For example, when the magnitude of a force applied to the operation portion 1090 by the manipulator is X Newton, the movement position determination unit 1092 determines a moving distance of the arm tip 1011 as X cm, or the movement position determination unit 1092 determines a moving speed of the arm tip 1011 as X cm/sec.

The movement position determination unit 1092 determines a rotating direction of the orientation of the arm tip 1011 on the basis of a direction (direction of the force acquired by the first force sensor 1020) of a moment applied to the operation portion 1090 by the manipulator. For example, when the manipulator applies a force to rotate the operation portion 1090 in an X-axis direction, the movement position determination unit 1092 determines the rotating direction as a direction in which the arm tip 1011 is rotated in the X direction.

The movement position determination unit 1092 determines the magnitude of a rotation angle or a rotating speed of the orientation of the arm tip 1011 on the basis of the magnitude (magnitude of the force acquired by the first force sensor 1020) of a moment applied to the operation portion 1090 by the manipulator. For example, when a force of rotation applied to the operation portion 1090 in the X-axis direction by the manipulator is X newton centimeter, the movement position determination unit 1092 determines a rotation angle at which the arm tip 1011 moves as X radian. Alternatively, the movement position determination unit 1092 determines a rotation angular speed at which the arm tip 1011 moves as X radian/sec.

Each time the position of the arm tip 1011 is determined, the movement position determination unit 1092 stores the position in a trajectory information holding unit 1095, which will be described later.

A teaching control unit 1093 receives information from the movement position determination unit 1092 and performs drive control of the motor 912M such that the arm tip 1011 is moved to a position determined by the movement position determination unit 1092. A tip-end position is controlled such that the rotating shaft of the motor 912M of the joint portion is rotationally driven in forward and backward directions. More specifically, at the start of teaching, the teaching control unit 1093 performs drive control of the respective motors 912M, moves the arm tip 1011 to a predetermined initial position, and performs drive control of the motors 912M to move the arm tip 1011 to the position determined by the movement position determination unit 1092.

Each of the motors 912M independently rotates each of the joint portions of the robot arm 1010 in forward and backward directions. In FIG. 1, although one box is conceptually shown, in fact, the motors 912M are attached to the joint portions of the robot arm 1010, respectively. The encoders 912E are connected to the motors 912M of the joint portions of a robot arm 1010A, respectively, to acquire angles of the joint portions.

As an example, the robot arm 1010A is a multi-joint robot arm having a plurality of multi-joint mechanisms, and two links 702 and 703 are rotationally driven about a plurality of joint shafts.

Specifically, the robot arm 1010A is a multi-link manipulator having 6 degrees of freedom. The robot arm 1010A includes a forearm link 702 having a wrist portion 701 at the arm tip 1011, an upper arm link 703 having a front end rotatably connected to a proximal end of the forearm link 702, and a base portion 704 on which the proximal end of the upper arm link 703 is rotatably connected and supported. The base portion 704 is fixed to a predetermined position. However, the base portion 704 may be movably connected to a rail (not shown). The wrist portion 701, for example, has three rotating shafts, that is, a fourth joint portion, a fifth joint portion, and a sixth joint portion which are orthogonal to each other, respectively, and can change a relative orientation (direction)

of the arm tip 1011 with respect to the forearm link 702. More specifically, the fourth joint portion can change a relative orientation around a horizontal axis of the arm tip 1011 with respect to the wrist portion 701. The fifth joint portion can change a relative orientation around a vertical axis, orthogonal to the horizontal axis of the fourth joint portion, of the arm tip 1011 with respect to the wrist portion 701. The sixth joint portion can change a relative orientation around a horizontal axis, orthogonal to each of the horizontal axis of the fourth joint portion and vertical axis of the fifth joint portion, of the arm tip 1011 with respect to the wrist portion 701. The other end of the forearm link 702 can be rotated around the third joint portion with respect to the front end of the upper arm link 703, i.e., a horizontal axis parallel to the horizontal axis of the fourth joint portion. The other end of the upper arm link 703 can be rotated around the second joint portion with respect to the base portion 704, i.e., the horizontal axis parallel to the horizontal axis of the fourth joint portion. Furthermore, an upper movable portion of the base portion 704 can be rotated around the first joint portion with respect to a lower fixing portion of the base portion 704, i.e., around a vertical axis parallel to the vertical axis of the fifth joint portion.

As a result, the robot arm 1010A configures a multi-link manipulator that can be rotated around a total of six axes and has 6 degrees of freedom.

Each of the joint portions configuring the rotating portions of the axes of the robot arm 1010A includes a rotational drive device such as the motor 912M for driving joint portion, and the encoder 912E (in actuality, arranged inside each of the joint portions of the robot arm 1010A) that detects a rotating phase angle (i.e., a joint angle) of the rotating shaft of the motor 912M to output position information. The motor 912M (in actuality, arranged inside each of the joint portions of the robot arm 1010A) is driven and controlled by the teaching control unit 1093 or a replay control unit 1094 that respectively incorporate the functions of a motor driver included in one member of one pair of members (for example, a pivotal side member and a support side member that supports the pivotal side member) configuring each of the joint portions. The rotating shaft of the motors 912M included in the one member of each of the joint portions is connected to the other member of each of the joint portions, and the rotating shaft is rotated in forward and backward directions to make it possible to rotate the other member around each of the shafts with respect to the one member.

The position information acquiring unit 1013 acquires a position and an orientation of the arm tip 1011 of the robot arm 1010A. Specifically, the position information acquiring unit 1013 acquires a position and an orientation of the arm tip 1011 on the basis of a joint angle of each of the joints and a length of each of the joints (information previously stored in an internal storage device of the position information acquiring unit 1013) that are acquired by the encoder 912E.

A mode input unit 1091 accepts a manipulator's input of a processing mode performed by the robot arm 1010. As options for modes that can be selected by the mode input unit 1091, three options "replay is performed", "teaching is performed", and "not execute" are given. The mode input unit 1091 can be configured by, for example, a switch, a button, a keyboard, or a mouse of a personal computer, or the like. The manipulator selects any one of the modes (options) by using the mode input unit 1091. The mode input unit 1091 outputs the selected mode (option) information to a management unit 1012 and a mode holding unit 1096. In the first embodiment, the mode input unit 1091 outputs "1" when the mode "teaching is performed" is input to the mode input unit 1091, the mode input unit 1091 outputs "2" when the mode "replay is performed" is input thereto, and the mode input unit 1091 outputs "0" when the mode "not execute" is input thereto. When teaching in execution is stopped, the mode "not execute" is input to the mode input unit 1091 to stop the teaching.

The mode holding unit 1096 is a storage device such as a ROM, a RAM, a HDD, a register, a cache, or the like of a personal computer that holds (store or memorize) mode information input to the mode input unit 1091. Hereinafter, units or devices (except for a flexible body holding unit) each including a "holding unit" as a name of a constituent element are similar storage devices. When the mode input unit 1091 is a mechanical button switch or the like, the mode input unit 1091 also serves as the mode holding unit 1096. For example, two pieces of mode information representing a state in which the mechanical button switch is mechanically depressed by a pressing manipulation of the manipulator and a state in which the depressed button returns to an original position by repressing are mechanically held to make it possible to exert the function of the holding unit. In this case, the mode holding unit 1096 holds "1" when the mode "teaching is performed" is input to the mode input unit 1091, the mode holding unit 1096 holds "2" when the mode "replay is performed" is input, and the mode holding unit 1096 holds "0" when the mode "not execute" is input. The mode holding unit 1096 holds "0" in an initial state.

The trajectory information holding unit 1095 is a storage device that holds trajectory data acquired by the movement position determination unit 1092. The trajectory data includes positions and orientations of the arm tip 1011 at a plurality of times and a set of pieces of information of the positions and the orientations of the arm tip 1011. One position and one orientation are 6-dimensional data including an X coordinate, a Y coordinate, a Z coordinate, a roll, a pitch, and a yaw. When teaching by the teaching control unit 1093 is performed a plurality of times, the trajectory information holding unit 1095 holds a plurality of trajectory data corresponding to the respective teachings. FIG. 2 shows trajectory data held by the trajectory information holding unit 1095. An nth column is teaching data obtained by an nth teaching (note that n is an integer larger than 1). (xn__0, yn__0, zn__0, rxn__0, ryn__0, and rzn__0) in the nth teaching data indicate a position of the arm tip 1011 at an initial position at the start of teaching, and (xn_t, yn_t, zn_t, rxn_t, ryn_t, and rzn_t) indicate a position of the arm tip 1011 at tth time from the start of teaching. Reference symbols xn_t, yn_t, zn_t, rxn_t, ryn_t, and rzn_t indicate an coordinate, a y coordinate, a z coordinate, a roll angle, a pitch angle, and a yaw angle, respectively. Reference symbols xn_t, yn_t, zn_t, rxn_t, ryn_t, and rzn_t indicate an x coordinate, a y coordinate, a z coordinate, a roll angle, a pitch angle, and a yaw angle, respectively.

The replay control unit 1094 performs drive control of the motors 912M to reproduce a taught task on the basis of information from the management unit 1012, which will be described later. The replay control unit 1094 performs drive control of the motors 912M such that the arm tip 1011 moves to have a position and an orientation held by the trajectory information holding unit 1095. Control of a tip-end position is performed by rotating the rotating shafts of the motors 912M of the joint portions in forward and backward directions. Upon completion of the movement on the trajectory held by the trajectory information holding unit 1095, the robot arm 1010 is controlled to be moved or stopped. When the trajectory information holding unit 1095 has a plurality of pieces of trajectory information, the final trajectory information is executed.

The management unit 1012, on the basis of the information of the mode input unit 1091, manages execution of the operation of the robot arm 1010, and, on the basis of a switching output of the modes by the mode input unit 1091, switches the control of the teaching control unit 1093 and the replay control unit 1094 to execute the switched control. When the mode input unit 1091 notifies the management unit 1012 of "1" representing the mode "teaching is performed", the management unit 1012 starts the control of the teaching control unit 1093. When the mode input unit 1091 notifies the management unit 1012 of "2" representing the mode "replay is performed", the management unit 1012 starts the control of the replay control unit 1094. When the mode input unit 1091 notifies the management unit 1012 of "0" representing the mode "not execute", the management unit 1012 controls to stop the robot arm 1010.

When the management unit 1012 is notified of "1" representing the mode "teaching is performed", after the arm tip 1011 is moved to an initial position of teaching held in the management unit 1012, the management unit 1012 controls the teaching control unit 1093 as an initial operation.

<Object 1 of Direct Teaching>

When a trajectory of an assembly task of the flexible body 1040 is taught and replayed by using the robot apparatus 1000, assembling may be failed. A difference in a degree of curvatures of the flexible body 1040 between in a teaching state and a replay state will be described with reference to FIGS. 3A to 4D and FIGS. 23A to 23D.

FIGS. 3A to 3D each show an example of a section obtained when the second end 1042 of the flexible body 1040 comes close to the insertion opening 1051 in a teaching state.

Figure 3A:
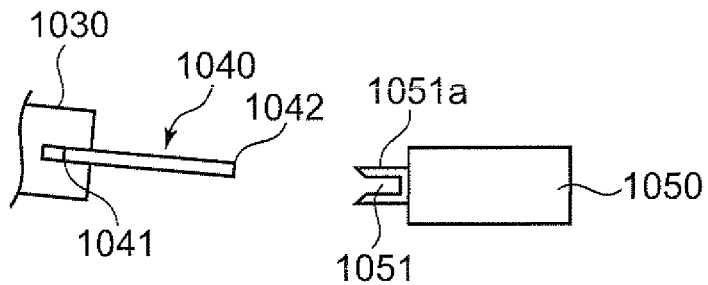
FIG. 3A is a view showing a degree of curvature of a flexible body in a teaching state in a configuration of direct teaching to explain the object of the present disclosure.

As shown in FIG. 3A, the flexible body 1040 is not in contact with a peripheral portion 1051*a* of the insertion opening 1051. In FIG. 3A, a first end 1041 on the left of the flexible body 1040 is fixed to a fixing portion 1030. The first end 1041 of the flexible body 1040 is fixed by the fixing portion 1030, and the second end 1042 of the flexible body 1040 is not fixed. This step is called a non-contact step.

Figure 3B:
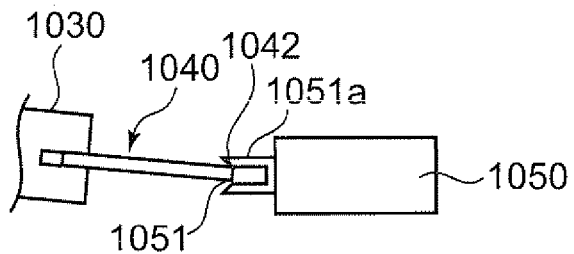
FIG. 3B is a view showing a degree of curvature of a flexible body in a teaching state in the configuration of direct teaching subsequently to FIG. 3A.

Next, the manipulator manipulates the robot arm 1010 to move the flexible body 1040, and a part (second end 1042) of the flexible body 1040 is brought into contact with the peripheral portion 1051*a* of the insertion opening 1051 as shown in FIG. 3B. In this step, a part of the second end 1042 of the flexible body 1040 is merely in contact with the peripheral portion 1051*a* of the insertion opening 1051, and the direction of the flexible body 1040 with respect to the insertion opening 1051 is not adjusted. This step is called a contact step.

Figure 3C:
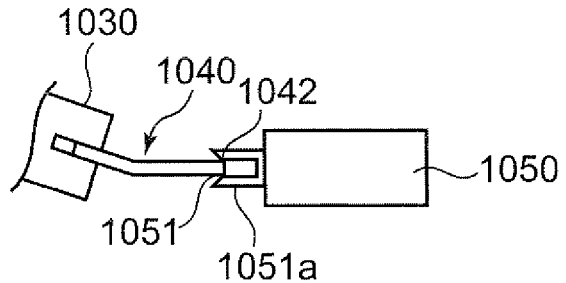
FIG. 3C is a view showing a degree of curvature of a flexible body in a teaching state in the configuration of direct teaching subsequently to FIG. 3B.

Furthermore, the second end 1042 of the flexible body 1040 moved by the manipulator is brought into tight contact with the peripheral portion 1051*a* of the insertion opening 1051 as shown in FIG. 3C, and the second end 1042 is ready to be inserted into the insertion opening 1051. At this time, both the ends 1041 and 1042 of the flexible body 1040 are constrained and, in many cases, the flexible body 1040 is transformed and bent. In this case, the flexible body 1040 that is convexly bent downward is shown. This step will be called a reaching step hereinafter.

Figure 3D:
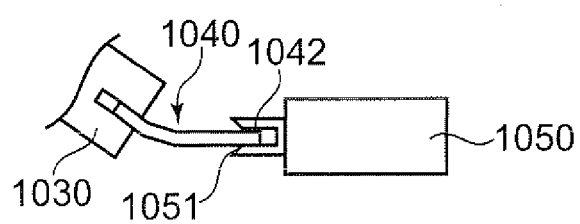
FIG. 3D is a view showing a degree of curvature of a flexible body in a teaching state in the configuration of direct teaching subsequently to FIG. 3C.

Finally, the flexible body 1040 moved by the manipulator, as shown in FIG. 3D, is deeply inserted into the insertion opening 1051. This step will be called a completion step hereinafter.

Figure 23A:
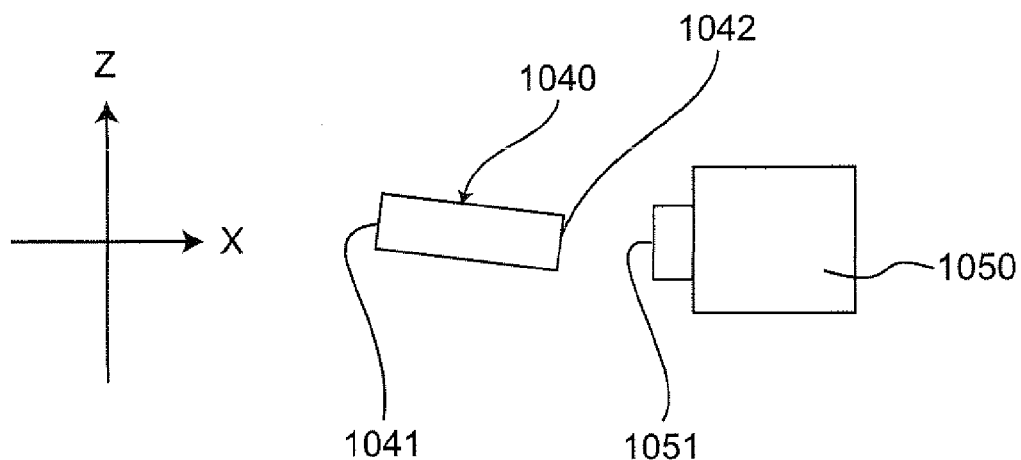
FIG. 23A is a sectional view of the step in FIG. 3A for explaining the object of the present disclosure when viewed from another direction (a direction viewed from the top to the bottom along a Y axis in FIG. 1)
Figure 23B:
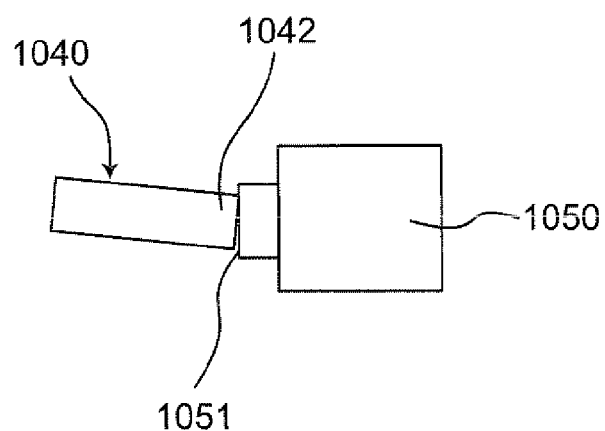
FIG. 23B is a sectional view of the step in FIG. 3B for explaining the object of the present disclosure when viewed from another direction (a direction viewed from the top to the bottom along a Y axis in FIG. 1)
Figure 23C:
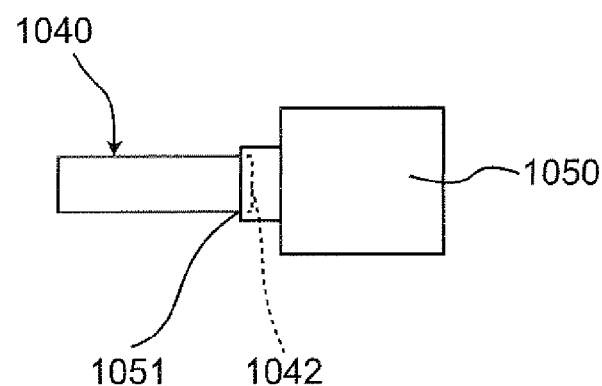
FIG. 23C is a sectional view of the step in FIG. 3C for explaining the object of the present disclosure when viewed from another direction (a direction viewed from the top to the bottom along a Y axis in FIG. 1)
Figure 23D:
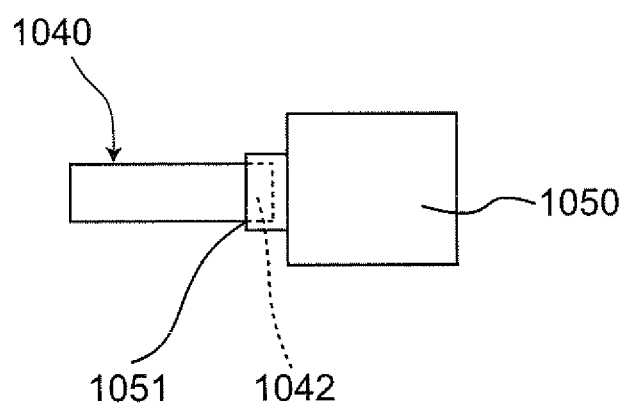
FIG. 23D is a sectional view of the step in FIG. 3D for explaining the object of the present disclosure when viewed from another direction (a direction viewed from the top to the bottom along a Y axis in FIG. 1)

FIGS. 23A to 23D show sections obtained when the steps in FIGS. 3A to 3D are viewed from another direction (direction viewed from the top to the bottom along a Y axis in FIG. 1). As shown in FIG. 23B, in the non-contact step (A) and the contact step (B), a direction (rotating direction on an X-Z plane) of the flexible body 1040 is not equal to a direction (rotating direction on an X-Z plane) of the insertion opening 1051. On the other hand, as shown in FIGS. 23C and 23D, in the reaching step (C) and the completion step (D), a direction (rotating direction on an X-Z plane) of the flexible body 1040 is equal to a direction (rotating direction on an X-Z plane) of the insertion opening 1051. More specifically, a contact state in FIG. 3D is a step in which a part of the second end 1042 of the flexible body 1040 is in contact with the insertion opening 1051, and a reaching state in FIG. 3C is a step in which the entire of the second end 1042 of the flexible body 1040 is in contact with the insertion opening 1051.

In an experiment executed by the present inventors, the flexible body 1051 is bent in every completion step. FIG. 3D shows a state in which the flexible body 1040 is convexly bent downward. The flexible body 1040 in the step in FIG. 3D is bent more sharply than that in the step in FIG. 3C. The flexible body 1051 is difficult to be inserted into the insertion opening 1051 while being kept straight.

After the above teaching is performed, when replay is performed to move the arm tip 1011 on a taught trajectory, in many cases, the flexible body 1040 is not inserted into the insertion opening 1051. More specifically, reproduction of the inserting task is failed.

Figure 4A:
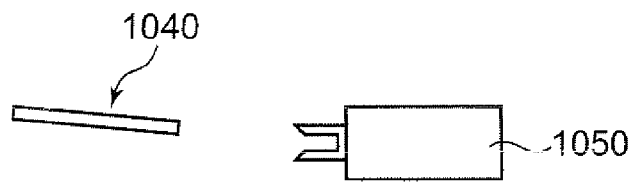
FIG. 4A is a view showing a degree of curvature of a flexible body in a replay state in a configuration of direct teaching to explain the object of the present disclosure.
Figure 4B:
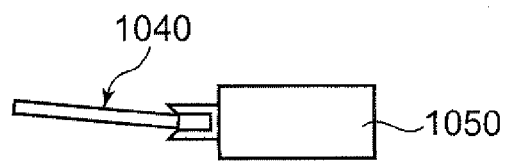
FIG. 4B is a view showing a degree of curvature of a flexible body in a replay state in the configuration of direct teaching subsequently to FIG. 4A to explain the object of the present disclosure.

FIGS. 4A to 4D each show an example of a positional relationship between the flexible body 1040 and the insertion opening 1051 when the reproduction of the insertion is failed. In FIGS. 4A to 4B, the flexible body 1040 moves as in the cases in FIGS. 3A to 3B.

Figure 4C:
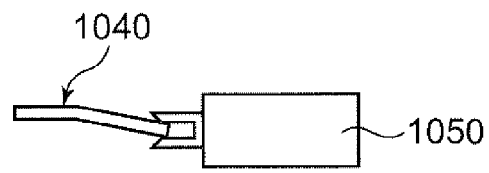
FIG. 4C is a view showing a degree of curvature of a flexible body in a replay state in the configuration of direct teaching subsequently to FIG. 4B to explain the object of the present disclosure.

Next, in FIG. 4C, the flexible body 1040 is not well inserted into a gap of the insertion opening 1051, and is bent at the inlet of the insertion opening 1051. In FIG. 4C, the flexible body 1040 is bent in the opposite direction of the direction in FIG. 3C or 3D and convexly bent upward.

Figure 4D:
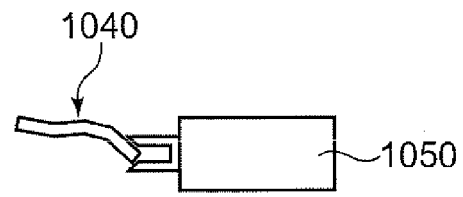
FIG. 4D is a view showing a degree of curvature of a flexible body in a replay state in the configuration of direct teaching subsequently to FIG. 4C to explain the object of the present disclosure.

Furthermore, the flexible body 1040 is further convexly bent upward as shown in FIG. 4D by being pressed toward the insertion opening 1051.

As described above, when replaying the task of inserting the second end 1042 of the flexible body 1040 into the insertion opening 1051 by using the robot arm 1010, the contact position of the second end 1042 of the flexible body 1040 to the insertion opening 1051 slightly changes in every replay, and the degree of curvature of the flexible body 1040 also slightly changes in every replay. For this reason, reproduction of the inserting task is difficult.

The reason why the degree of curvature of a flexible body changes may be that the flexible body 1040 is attached to the fixing portion 1030 with a different degree of curvature in the state in FIG. 3A or 4A, or that the second end 1042 of the flexible body 1040 is brought into contact with the insertion opening 1051 with a different degree of curvature in every inserting task in the state in FIG. 4B or 4B.

As described above, the reason for the failure of insertion in the replay state may be based on a distribution of degrees of curvature of the flexible body 1040. In the teaching state, the manipulator performs insertion with a delicate manipulation to make the flexible body 1040 suitable for a degree of curvature in the teaching state. However, the flexible body in the replay state has a degree of curvature different from that in the teaching state, and replay is not performed with a delicate manipulation depending on a degree of curvature in the replay state.

Thus, when force control as described in Patent Literature 1 is performed, control in which the same change in force as that in the teaching state is reproduced is performed in the replay state. However, in the replay state, the flexible body has a degree of curvature different from that in the teaching state. Since teaching corresponding to the degree of curvature in the replay state is not actually performed, insertion may be failed under the force control.

With the robot apparatus 1000A, an experiment to examine a success rate of insertion in the replay state was repeated in the case that the teaching is performed. As a result, the present inventors confirmed that a probability that the replay succeeds changes depending on directions of the first end 1041 of the flexible body 1040 in the stage of FIG. 3C in the teaching state. The details will be described below. FIGS. 5A and 5B are views each showing a relationship between a direction of the first end 1041 of the flexible body 1040 and a degree of curvature of the flexible body 1040. The flexible body 1040 in FIG. 5B is bent more sharply than the flexible body 1040 in FIG. 5A. In the executed experiment with the robot apparatus 1000A, a success rate of insertion obtained in the case that the teaching as shown in FIG. 5B is performed is higher than that obtained in the case that the teaching as shown in FIG. 5A is performed. FIG. 6 is a table-format view showing evaluations of degrees of curvature of a flexible body in a teaching state and success probabilities of insertion when replay is performed 20 times by using a plurality of teaching data. A method of evaluating a degree of curvature will be described later. In the table-format view in FIG. 6, when a degree of curvature of the flexible body is high in a teaching state, a success probability of insertion in a replay state is high. There is a slight difference between a degree of curvature when insertion succeeds and a degree of curvature when insertion is failed. It is understood that the slight difference considerably influences the success rate. In FIG. 6, a degree of curvature is 11.5 or less. This is because the manipulator cannot insert the flexible body 1040 such that the flexible body 1040 is bent more sharply.

Figure 4E:
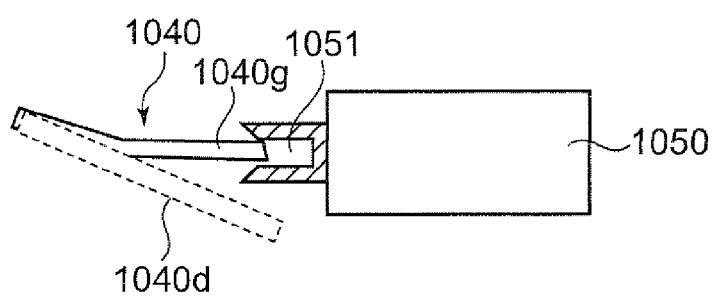
FIG. 4E is a view showing a manner performed when a manipulator bends a flexible body at a degree of curvature higher than the maximum value.

FIG. 4E is a view showing a manner of the flexible body 1040 supposed when the manipulator bends a flexible body 1040 at a degree of curvature higher than the maximum value. When the manipulator intends to bend the flexible body 1040 more sharply at a solid line position 1040g, the flexible body 1040 moves to a dotted line position 1040d. More specifically, the front end of the flexible body 1040 is flicked out of the insertion opening 1051, and the flexible body 1040 cannot be inserted into the insertion opening 1051. However, actually, the manipulator well controls the flexible body 1040, such failed teaching does not occur. More specifically, teaching in which the flexible body 1040 is bent at a degree of curvature higher than the maximum value is not performed. In a replay state, such a failure does not occur.

As described above, it is understood that, when the bent flexible body 1040 that reaches the inlet of the insertion opening 1051 is inserted into the insertion opening 1051, the success rate of insertion in a replay state is improved. As shown in FIG. 5A, in the case that the flexible body 1040 is not bent or in the case that a degree of curvature of the flexible body 1040 is insufficient when the flexible body 1040 reaches the inlet of the insertion opening 1051, in a replay state (of a task of shifting from the step in FIG. 3C to the step in FIG. 3D), the flexible body 1040 may be convexly bent upward or convexly bent downward. However, as shown in FIG. 5B, when insertion of the flexible body 1040 is started from the state in which the flexible body 1040 is convexly bent downward, in a replay state (of a task of shifting from the step in FIG. 3C to the step in FIG. 3D), the flexible body 1040 moves while being kept convexly bent downward, and the flexible body 1040 is successfully inserted.

In this manner, it can be decided that teaching having an orientation in FIG. 5B is more effective than teaching having an orientation in FIG. 5A. However, when the manipulator performs teaching a plurality of times, the number of teaching each having the orientation in FIG. 5A is overwhelmingly large, and the number of teachings each having the orientation in FIG. 5B is small. This is because, although the manipulator needs only to press the flexible body 1040 in a traveling direction in FIG. 5A, the manipulator needs to press the flexible body 1040 in the right direction in FIG. 5B while the manipulator applies a rotating force to the flexible body 1040 to bend the flexible body 1040 in FIG. 5B. Since the direction in which the manipulator applies a force is different from a direction in which the manipulator moves the flexible body 1040, the manipulator cannot easily perform the task.

In the first embodiment of the present disclosure, the teaching device for robot apparatus includes an evaluation device that evaluates whether a trajectory obtained by teaching is a trajectory on which the inserting task easily succeeds or a trajectory on which the inserting task is difficult to succeed. More specifically, the teaching device gives the teaching having the orientation in FIG. 5B evaluation higher than that of the teaching having the orientation in FIG. 5A.

First Embodiment

Figure 7:
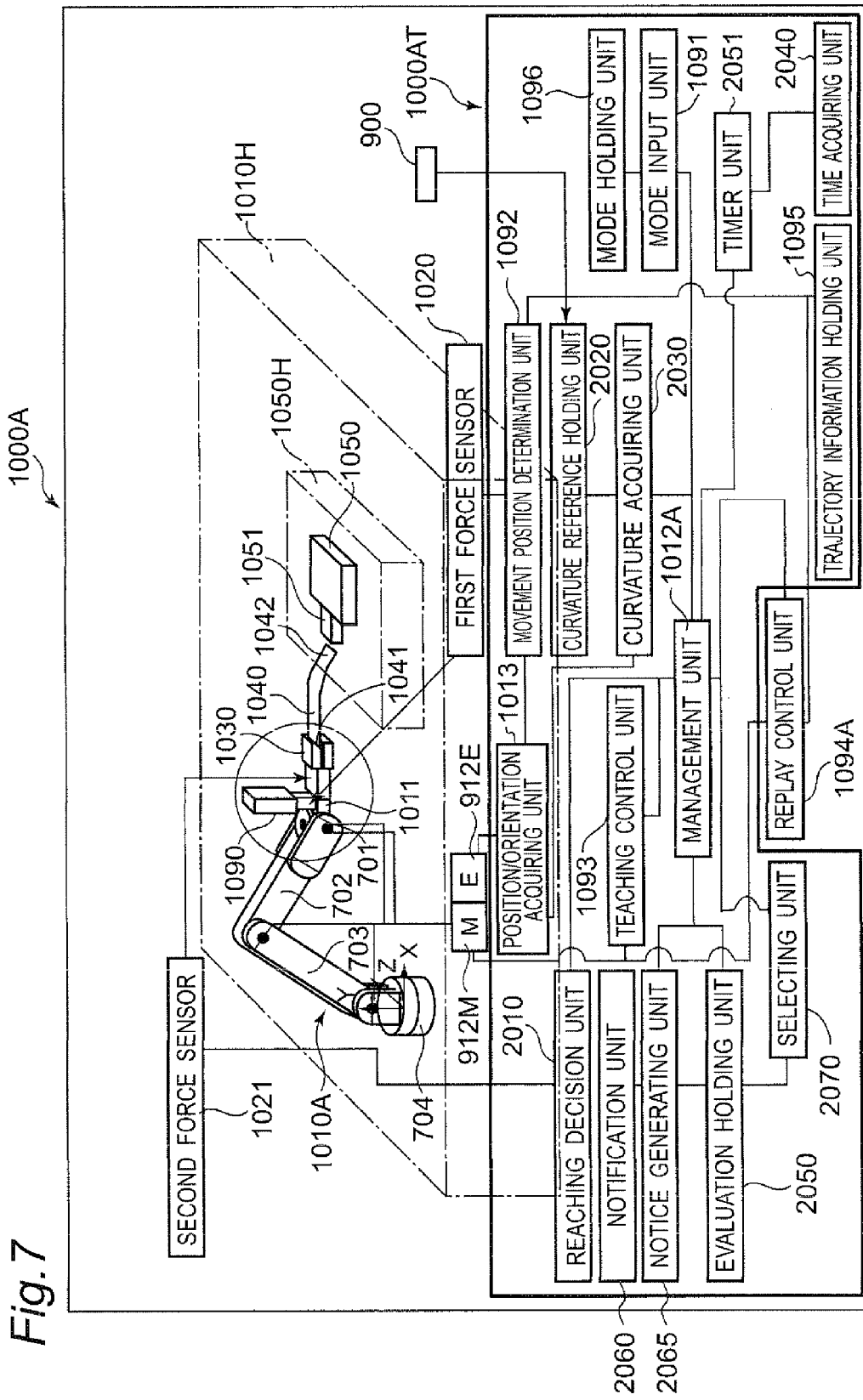
FIG. 7 is a view showing a robot apparatus according to a first embodiment of the present disclosure.

FIG. 7 shows the robot apparatus 1000A according to a first embodiment of the present disclosure. Like the robot apparatus 1000 in the configuration of direct teaching, the robot apparatus 1000A uses the robot arm 1010A serving as an example of a robot including a joint drive unit or a drive unit. A fitting task in which the flexible body 1040 serving as an object to be subjected to the task is held on the hand (fixing portion) 1030 of the robot arm 1010A, and the fixing portion 1030 is moved in a predetermined direction, so that the flexible body 1040 is inserted into the insertion opening 1051 fixed to the thing 1050 held on the thing placing table 1050H fixed on the installation floor 1010H on which the robot arm 1010 is installed is taught, or taught and replayed. The same elements as the constituent elements shown in FIG. 1 are the same as those in the description of the configuration of direct teaching, and are denoted by the same reference numerals in FIG. 7. Elements considerably different between FIGS. 1 and 7 include a second force sensor 1021, a reaching decision unit 2010, a notification unit 2060, a notice generating unit 2065, an evaluation holding unit 2050, a selecting unit 2070, a curvature reference holding unit 2020, and a curvature acquiring unit 2030. Elements slightly different between FIGS. 1 and 7 include a management unit 1012A and a replay control unit 1094A.

In this case, the robot apparatus 1000A is roughly configured by the robot arm 1010A, the first force sensor 1020, the second force sensor 1021, a teaching device 1000AT, and the replay control unit 1094A.

The teaching device 1000AT includes the position/orientation acquiring unit 1013, the movement position determination unit 1092, the teaching control unit 1093, the mode input unit 1091, the mode holding unit 1096, the trajectory information holding unit 1095, the management unit 1012, the reaching decision unit 2010, the notification unit 2060, the notice generating unit 2065, the evaluation holding unit 2050, the selecting unit 2070, the curvature reference holding unit 2020, and the curvature acquiring unit 2030.

Different elements between FIGS. 1 and 7 will be mainly described below.

The second force sensor 1021 is a force sensor arranged between the arm tip 1011 and the fixing portion 1030 and acquires a force applied on the fixing portion 1030. For example, the second force sensor 1021 acquires a force generated when the second end 1042 of the flexible body 1040 is brought into contact with the peripheral portion 1051a of the insertion opening 1051. The acquired information is output from the second force sensor 1021 to the reaching decision unit 2010.

The reaching decision unit 2010 decides, on the basis of the information from the second force sensor 1021, whether the second end 1042 of the flexible body 1040 reaches the inlet of the insertion opening 1051. Specifically, on the basis of the information from the second force sensor 1021, the reaching decision unit 2010 decides whether the state in FIG. 3B or 3C is achieved. In the first embodiment, when the force acquired by the second force sensor 1021 is larger than a predetermined force, the reaching decision unit 2010 decides that the second end 1042 of the flexible body 1040 reaches the insertion opening 1051. In contrast to this, when the force acquired by the second force sensor 1021 is the predetermined force or less, the reaching decision unit 2010 decides that the second end 1042 of the flexible body 1040 does not reach the insertion opening 1051. Information of the decision result obtained by the reaching decision unit 2010 is output to the management unit 1012A.

The curvature reference holding unit 2020 stores (holds) in advance information serving as a reference when a degree of curvature of the flexible body 1040 is decided, for example, information such as a hole direction 2170 of the insertion opening 1051.

The curvature acquiring unit 2030 acquires a degree of curvature representing a degree at which the flexible body 1040 is bent. In the first embodiment, decision of the degree of curvature of the flexible body 1040 is performed by the curvature acquiring unit 2030 on the basis of the information serving as the reference held in the curvature reference holding unit 2020.

A method of evaluating a degree of curvature by the curvature acquiring unit 2030 in the first embodiment will be described below with reference to FIG. 5A. In the first embodiment, when the reaching decision unit 2010 decides the reaching, a degree of curvature acquired by the curvature acquiring unit 2030 is defined as an evaluation of a degree of curvature obtained when the teaching is performed (details will be described in the management unit 1012). In FIG. 5A, when an angle between a direction 2150 of the front end of the flexible body 1040 on the first end 1041 side and a direction 2160 of the front end of the flexible body 1040 on the second end 1042 side is 180 degrees or −180 degrees (Π radians or −Π radians), the flexible body 1040 is straight. The curvature acquiring unit 2030 determines that, when the angle comes close to 0 degree (0 radian), the flexible body 1040 is bent.

Thus, on the basis of the angle between the aspect of the direction 2150 of the front end on the first end 1041 side and the aspect of the direction 2160 of the front end on the second end 1042 side, a degree of curvature of the flexible body 1020 can be evaluated by the curvature acquiring unit 2030. The aspect of the direction 2160 of the front end on the second end 1042 side can be acquired by a device such as an image processing unit, serving as an example of the curvature acquiring unit 2030, that processes an image photographed by a laser range finder or a camera.

As another example, a case using the curvature acquiring unit 2030 that does not use these devices will be described. In place of the aspect of the direction 2160 of the front end on the second end 1042 side, in the curvature acquiring unit 2030, approximation is performed by using the hole direction 2170 of the insertion opening 1051 of the thing 1050 held on the thing placing table 1050H fixed on the installation floor 1010H on which the robot arm 1010 is installed. When the second end 1042 of the flexible body 1040 reaches the insertion opening 1051, the aspect of the direction 2160 of the front end on the second end 1042 side is equal to the aspect of the hole direction 2170 of the insertion opening 1051. For this reason, this approximation is considered to be valid. At this time, the curvature reference holding unit 2020 in the first embodiment holds in advance information (information serving as an example of a predetermined direction) of the hole direction 2170 of the insertion opening 1051. For example, when the hole direction 2170 of the insertion opening 1051 is a −X direction in FIG. 7, the hole direction 2170 of the insertion opening 1051 is given by (−1, 0, 0). FIG. 8 shows an example of the information of the hole direction 2170 of the insertion opening 1051 held by the curvature reference holding unit 2020 and a state in which the (−1, 0, 0) is held. In this case, it is assumed that the thing 1050 is fixedly held in a task space by, for example, the thing placing table 1050H or the like, and it is assumed that the hole direction 2170 of the insertion opening 1051 does not change during the task.

If the direction of the thing 1050 changes during the task, an image photographed by the camera is processed through image processing or the like in the image processing unit to acquire a change in direction of the thing 1050 by the curvature acquiring unit 2030. On the basis of the conversion of direction acquired by the curvature acquiring unit 2030, the hole direction 2170 of the insertion opening 1051 may be calculated by the curvature acquiring unit 2030 and held in the curvature reference holding unit 2020. For example, when the thing 1050 is rotated by 180 degrees in a Z-axis direction from the state in FIG. 7, (1, 0, 0) obtained by rotating the hole direction 2170 (−1, 0, 0) of the insertion opening 1051 in FIG. 7 by 180 degrees in the Z-axis direction is defined as a hole direction obtained after the thing 1050 moves.

The hole direction 2170 of the insertion opening 1051 is determined by a shape of the insertion opening 1051 and a direction in which the insertion opening 1051 is arranged. In this case, it is assumed that the shape and the direction of the insertion opening 1051 do not change. More specifically, it is assumed that the hole direction 2170 itself of the insertion opening 1051 does not change. The manipulator inputs the hole direction 2170 in the curvature reference holding unit 2020 in advance by using an input device 900 such as a keyboard, a mouse, or a touch panel. Photographing is performed with the camera serving as an example of a photographing device, and image processing or the like of image data obtained by the photographing is performed, so that the hole direction 2170 of the insertion opening 1051 may be acquired by the curvature acquiring unit 2030 and held in the curvature reference holding unit 2020.

In this manner, the curvature acquiring unit 2030 acquires a degree of curvature representing a degree at which the flexible body 1040 is bent. More specifically, a degree of curvature of the flexible body 1040 in the first embodiment, as described above, is evaluated by the curvature acquiring unit 2030 on the basis of the angle between the direction 2150 of the front end on the first end 1041 side and the hole direction 2170 of the insertion opening 1051. The hole direction of the insertion opening 1051 is acquired by the curvature acquiring unit 2030 from the curvature reference holding unit 2020.

Since the first end 1041 moves together with the arm tip 1011, the direction of the first end 1041 is constant with respect to the direction of the arm tip 1011. Thus, the curvature acquiring unit 2030 detects the direction of the arm tip 1011 to make it possible to detect the direction of the first end 1041.

In this case, to simplify the description, it is assumed that the flexible body 1040 is attached to the arm tip 1011 such that the direction of the arm tip 1011 is the same as the direction of the first end 1041. For example, when the direction of the fixing portion 1030 in FIG. 9 is given by a vector (−1, 1, 0), the direction of the first end 1041 is also given by the vector (−1, 1, 0).

Subsequently, even though arm tip 1011 moves in any direction, the direction of the first end 1041 is the same as the direction of the arm tip 1011. The direction of the arm tip 1011 is calculated by the position/orientation acquiring unit 1013 and then, input to the curvature acquiring unit 2030.

The direction 2150 of the front end on the first end 1041 side in FIG. 9 is given by ($\alpha_X$, $\alpha_Y$, $\alpha_Z$), the hole direction 2170 of the insertion hole 1051 in FIG. 9 is given by ($T_X$, $T_Y$, $T_Z$), and the angle between the direction 2150 of the front end on the first end 1041 side and the hole direction 2170 of the insertion opening 1051 is given by θ. In this case, in accordance with the formula of inner product, $$\sqrt{\alpha_X^2+\alpha_Y^2+\alpha_Z^2}\sqrt{T_X^2+T_Y^2+T_Z^2}\cos\theta = \alpha_X T_X + \alpha_Y T_Y + \alpha_X T_X \quad (1)$$

is obtained, and the angle θ between the direction 2150 of the front end on the first end 1041 side and the hole direction 2170 of the insertion opening 1051 is given by $$\theta = \arccos\left(\frac{\alpha_X T_X + \alpha_Y T_Y + \alpha_X T_X}{\sqrt{\alpha_X^2+\alpha_Y^2+\alpha_Z^2}\sqrt{T_X^2+T_Y^2+T_Z^2}}\right). \quad (2)$$

In the numerical expression, arccos represents the inverse function of a cosine function.

As described above, the curvature acquiring unit 2030 decides that, when the angle θ between the direction 2150 of the front end on the first end 1041 side and the hole direction 2170 of the insertion opening 1051 is 180 degrees or −180 degrees (Π radians or −Π radians), the flexible body 1040 is straight and that, when the angle comes close to 0 degree (0 radian), the flexible body 1040 is bent.

In this case, an evaluation F(θ) of a degree of curvature is defined as $$F(\theta) = \frac{180 \times (\Pi - |\theta|)}{\Pi}. \quad (3)$$

In the above expression, |θ| represents the absolute value of the angle θ.

By the definition as described above, a domain of the angle θ is given by "−Π≤θ≤Π", a codomain of an evaluation F(θ) of the degree of curvature is given by "0≤F(θ)≤180". When the flexible body 1040 becomes to be straight, the angle θ comes close to Π radians (or −Π radians), and the evaluation F(θ) of the degree of curvature comes close to 0. When the flexible body 1040 is bent and the angle θ comes close to 0 radian, the angle θ comes close to 0 and the evaluation F(θ) of the degree of curvature is a value close to 180. The evaluation F(θ) of the degree of curvature is an absolute value of an angle between an inverted vector (vector obtained by multiplying the direction 2150 of the front end on the first end 1041 side by −1) of the direction 2150 of the front end of the flexible body 1040 on the first end 1041 side and the direction 2160 of the front end of the flexible body 1040 on the second end 1042 side.

In this case, it is assumed that a special case in which the flexible body 1040 is bent at two or more positions is excluded. When the flexible body 1040 is bent at two or more positions, reproduction of teaching is more difficult than that when the flexible body 1040 is not bent. For this reason, when it is confirmed that, by image processing or the like, the flexible body 1040 is bent at two or more positions to confirm that the flexible body 1040 is bent, the evaluation of the degree of curvature may be a low value in the curvature acquiring unit 2030.

The information of evaluation of the degree of curvature acquired by the curvature acquiring unit 2030 is output to the management unit 1012A.

The evaluation holding unit 2050 acquires, from the management unit 1012A which will be described later, the evaluation of the degree of curvature acquired by the curvature acquiring unit 2030 at a time the reaching decision unit 2010 decides reaching, and holds the evaluation. When teaching is performed a plurality of times, the evaluation of the degree of curvature is held in the evaluation holding unit 2050 for every teaching. FIG. 10 shows a data structure held in the evaluation holding unit 2050. An nth stage represents an evaluation of an nth teaching. The evaluation holding unit 2050 adds an evaluated value of the degree of curvature acquired by the management unit 1012A to the end of a data structure.

The notification unit 2060 notifies a manipulator of the information of evaluation held by the evaluation holding unit 2050 through the notice generating unit 2065. In this case, the notification unit 2060 is a display serving as an example that displays the information of evaluation held by the evaluation holding unit 2050 through the notice generating unit 2065.

The notice generating unit 2065, on the basis of the information of evaluation held by the evaluation holding unit 2050, generates notice contents of which the notification unit 2060 notifies a manipulator. In this case, an image displayed on a display serving as an example of the notification unit 2060 is generated. FIG. 11 shows an image generated by the notice generating unit 2065. As shown in FIG. 11, on an upper part of a screen 2060s of the display, top three evaluated values from the evaluated values held by the evaluation holding unit 2050 are displayed. On a lower part of the screen 2060s, a most recently acquired evaluated value is displayed.

Figure 12:
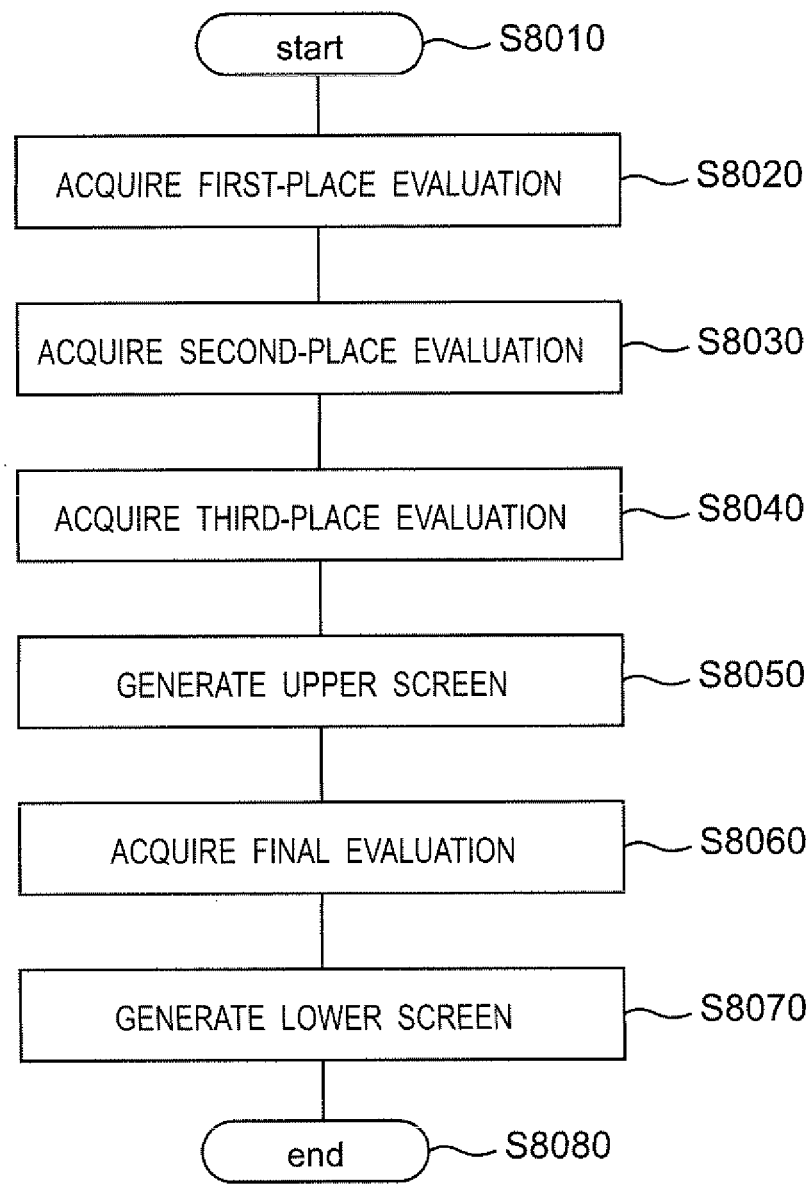
FIG. 12 is a flowchart showing a flow of processes performed by a notice generating unit in the robot apparatus according to the first embodiment of the present disclosure.

A flow of a generating process of an evaluated value to be displayed on the notification unit performed by the notice generating unit 2065 will be described below with reference to FIG. 12.

Firstly, in step S8010, the notice generating unit 2065 starts the process.

Next, in step S8020, the notice generating unit 2065 acquires information D1 representing what number teaching is teaching having the highest evaluation and information V1 representing the value of the evaluation (first-place evaluation) from the information of evaluation held by the evaluation holding unit 2050. FIG. 10 shows an example of information of evaluation held in the evaluation holding unit 2050. In FIG. 10, D1 and V1 are given by D1=3 and V1=18.4, respectively.

Next, in step S8030, the notice generating unit 2065 acquires information D2 representing what number teaching is teaching having the second highest evaluation and a value V2 representing the evaluation (second-place evaluation) from the information of evaluation held in the evaluation holding unit 2050. In FIG. 10, D2 and V2 are given by D2=2 and V1=18.0, respectively.

Next, in step S8040, the notice generating unit 2065 acquires information D3 representing what number teaching is teaching having the third highest evaluation and a value V3 representing the evaluation (third-place evaluation) from the information of evaluation held in the evaluation holding unit 2050. In FIG. 10, D3 and V3 are given by D3=5 and V1=17.8, respectively.

Next, in step S8050, the notice generating unit 2065 assigns the acquired pieces of information of D1 to D3 and the acquired pieces of information of V1 to V3 to the second column of a table-format view and the third column of the table, respectively, as shown in FIG. 11 to generate an upper table. "Best 3 evaluations of degrees of curvature" described outside the frame of the first column of the table is always expressed as a fixed character string.

Next, in step S8060, the notice generating unit 2065 acquires information of the final evaluation (last evaluation) V_LAST held in the evaluation holding unit 2050. The information of evaluation held in the evaluation holding unit 2050 is given by V_LAST=16.5 in FIG. 10.

Next, in step S8070, the notice generating unit 2065 uses V_LAST as a character string displayed on a lower portion of the table to generate a table-format view as shown in FIG. 11. "This time" described outside the frame of the first column of the lower table is always expressed as a fixed character string.

In this case, the value V_LAST is compared with the value V3. When the value V_LAST is smaller, a character string representing that "Please bend more sharply." may be displayed. More specifically, when this evaluation is worse than the top 3 evaluations, the manipulator may be notified to bend the flexible body more sharply. In this case, the comparison between V_LAST and V3 is only an example, and V_LAST may be compared with another-ranking evaluation (V1, . . . ) except for V3 or a specific evaluated value. An average value of V1 to V3 may be compared with V_LAST. V_1 . . . of V_LAST may be compared with each other to notify of the ranking of V_LAST.

Next, in step S8080, the notice generating unit 2065 ends the process.

In this manner, the evaluation process is performed by the notice generating unit 2065 to generate an evaluated value to be displayed on the notification unit shown in FIG. 11.

When teaching is performed a plurality of times, teaching by which a trajectory is generated is selected to be replayed and determined in the selecting unit 2070. The determination of a trajectory to be replayed is performed by the selecting unit 2070 on the basis of the information of evaluation acquired by the curvature acquiring unit 2030 and held in the evaluation holding unit 2050 through the management unit 1012A. In this case, trajectory data having a high degree of curvature when the second end 1042 of the flexible body 1040 reaches the inlet of the insertion opening 1051 is selected by the selecting unit 2070. More specifically, of a plurality pieces of information of evaluation held in the evaluation holding unit 2050, the number of teaching having the highest evaluation is selected by the selecting unit 2070. The information selected by the selecting unit 2070 is output to the management unit 1012A and used in a replay state.

The replay control unit 1094A performs control in reproduction of a taught task. The replay control unit 1094A performs control to drive the motors 912M of the joint portions with respect to a position and an orientation held in the trajectory information holding unit 1095 and to move the arm tip 1011. Upon completion of the movement of the trajectory held by the trajectory information holding unit 1095, the replay control unit 1094A performs control to stop drive of the robot arm 1010A. When the trajectory information holding unit 1095 has a plurality pieces of trajectory data, the trajectory selected by the selecting unit 2070 is executed by the replay control unit 1094A.

The management unit 1012A manages an overall operation of the robot arm 1010A. The management unit 1012A switches control of the teaching control unit 1093 and control of the replay control unit 1094A to control the operation of the robot arm 1010A. The management unit 1012A holds, in the evaluation holding unit 2050, an evaluation of a degree of curvature acquired by the curvature acquiring unit 2030 at time at which the reaching decision unit 2010 decides reaching, as an evaluation of a degree of curvature to the entire teaching, and the management unit 1012A gives the notice generating unit 2065 a designation to execute notice generation.

<Flow of Processes of Robot Arm 1010A>

Figure 13:
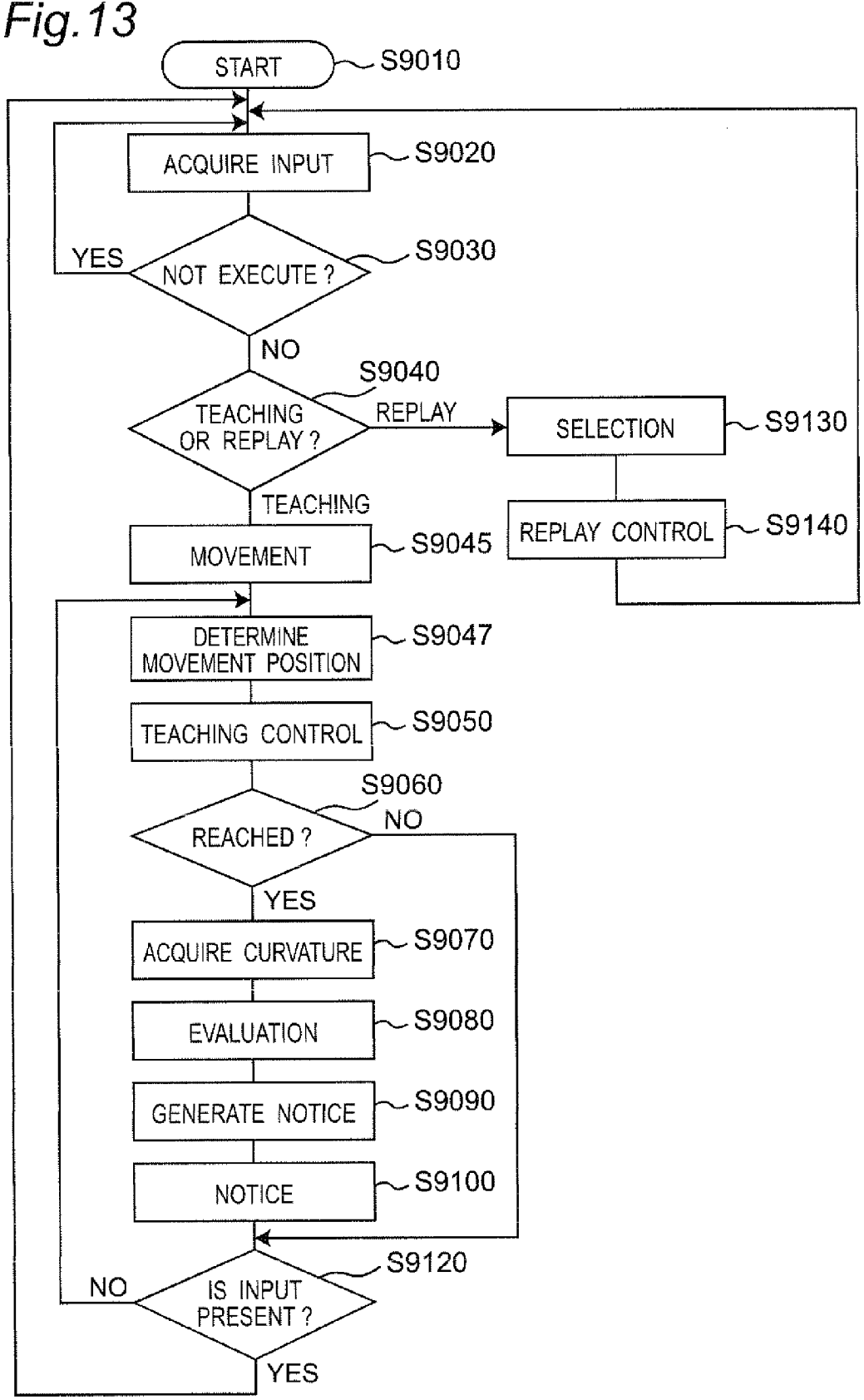
FIG. 13 is a flowchart showing a flow of processes of a robot arm in the robot apparatus according to the first embodiment.

A flow of processes of the robot arm 1010A by the management unit 1012A will be described below with reference to FIG. 13.

Firstly, in step S9010, the management unit 1012A starts the processes.

Next, in step S9020, the management unit 1012A acquires a notice from the mode input unit 1091. More specifically, the management unit 1012A acquires, from the mode input unit 1091, an input one of three process modes "replay is performed", "teaching is performed", and "not execute" performed by the manipulator through the robot arm 1010A.

Next, in step S9030, the management unit 1012A performs branching by the acquired notice. More specifically, when the acquired notice is "0" representing "not execute", the flow is branched to step S9020, otherwise, the flow is branched to step S9040.

In step S9040, the management unit 1012A performs branching by the acquired notice. When the input acquired by the mode input unit 1091 is "1" representing "teaching is performed", the flow is branched to step S9045. When the input is "2" representing "replay is performed", the flow is branched to step S9130.

In step S9045, the teaching control unit 1093 performs drive control of the respective motors 912M to move the arm tip 1011 to a predetermined initial position.

Next, in step S9047, the movement position determination unit 1092 determines a position to which the arm tip 1011 moves on the basis of a force acquired by the first force sensor 1020, i.e., a force applied to the operation portion 1090 by the manipulator.

Figure 14A:
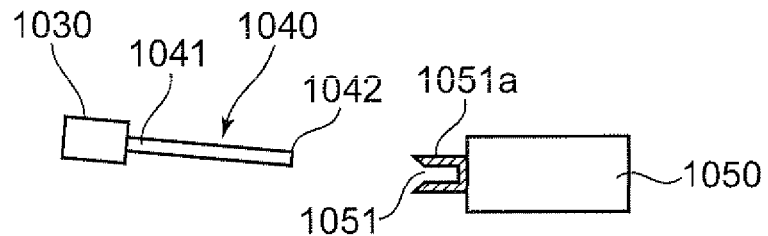
FIG. 14A is a view showing a change in degree of curvature of a flexible body in a teaching state and a replay state in the robot apparatus according to the first embodiment of the present disclosure.

Next, in step S9050, on the basis of switching to teaching control by the management unit 1012A, the teaching control unit 1093 performs drive control of the respective motors 912M and performs control to move the arm tip 1011 from the initial position to the movement position determined by the movement position determination unit 1092 (see FIG. 14A).

Next, in step S9060, the reaching decision unit 2010 decides whether the second end 1042 of the flexible body 1040 reaches the insertion opening 1051. When the reaching decision unit 2010 decides the reaching (see FIG. 14B), the flow is branched to step S9070. When the reaching decision unit 2010 does not decide the reaching, the flow is branched to step S9120. When the reaching decision is performed after the teaching is started, the flow is branched to step S9120.

In step S9070, after the reaching decision unit 2010 decides the reaching, the curvature acquiring unit 2030 acquires an evaluation of a degree of curvature of the flexible body 1040. As an example, on the basis of the pieces of information of the position/orientation acquiring unit 1013 and the curvature reference holding unit 2020, the curvature acquiring unit 2030 acquires information of an evaluation of a degree of curvature of the flexible body 1040 and outputs the acquired information of evaluation of the degree of curvature of the flexible body 1040 to the management unit 1012A.

Next, in step S9080, the management unit 1012A stores, in the evaluation holding unit 2050, the evaluation of the degree of curvature acquired by the curvature acquiring unit 2030 in step S9070.

Next, in step S9090, the notice generating unit 2065 generates a display screen such as evaluation information to notice the manipulator through the notification unit 2060. More specifically, the process in FIG. 12 is performed.

Next, in step S9100, the notification unit 2060 displays the display screen generated by the notice generating unit 2065 on a display.

Next, in step S9120, branching is performed depending on whether the mode input unit 1091 outputs a new notice to the management unit 1012A. More specifically, when a notice is not newly output from the mode input unit 1091 to the management unit 1012A (when a new input is not performed to the mode input unit 1091), the flow is branched to step S9047 to continue teaching. When a new output from the mode input unit 1091 to the management unit 1012A is present, the flow is branched to step S9020 to perform a process depending on the input.

On the other hand, in step S9130, on the basis of the information of evaluation held in the evaluation holding unit 2050, the selecting unit 2070 selects trajectory data having a high evaluation in teaching data, and outputs the selected information to the management unit 1012A.

Next, in step S9140, on the basis of switching to replay control by the management unit 1012A, the replay control unit 1094A replays trajectory data selected in step S9130. Upon completion of the replay, the flow returns to step S9020.

As a concrete replay performed at this time, the respective motors 912M of the joint portions are controlled under the control of the replay control unit 1094A to perform the following operation.

More specifically, in FIG. 14A, the first end 1041 on the left of the flexible body 1040 is fixed to the fixing portion 1030 of the robot arm 1010A. The second end 1042 of the flexible body 1040 is not fixed. In FIG. 14A, with the movement of the fixing portion 1030 of the robot arm 1010A to the right, the second end 1042 of the flexible body 1040 comes close to the insertion opening 1051, and the flexible body 1040 and the peripheral portion 1051a of the insertion opening 1051 are not in contact with each other. This step is a non-contact step.

Figure 14B:
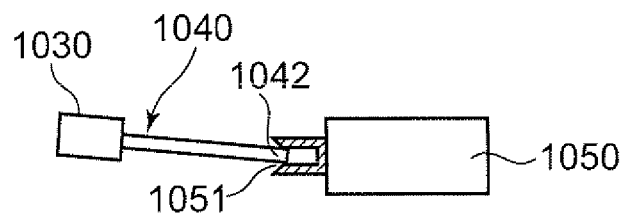
FIG. 14B is a view showing a change in degree of curvature of the flexible body in the teaching state and the replay state in the robot apparatus according to the first embodiment of the present disclosure subsequently to FIG. 14A.

Next, as shown in FIG. 14B, the fixing portion 1030 of the robot arm 1010A further moves to the right, the second end 1042 of the flexible body 1040 further comes close to the insertion opening 1051, and a part (the second end 1042) of the flexible body 1040 is brought into contact with the peripheral portion 1051a of the insertion opening 1051. In this step, a part of the second end 1042 of the flexible body 1040 is merely in contact with the peripheral portion 1051a of the insertion opening 1051, and the direction of the flexible body 1040 is not adjusted with respect to the insertion opening 1051. This step is a contact step.

Figure 14C:
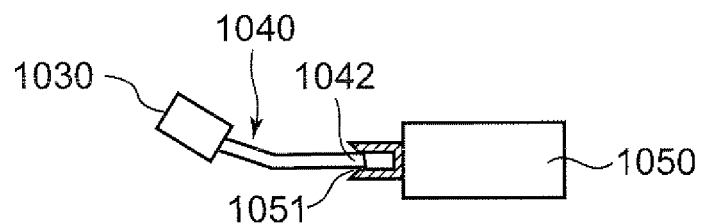
FIG. 14C is a view showing a change in degree of curvature of the flexible body in the teaching state and the replay state in the robot apparatus according to the first embodiment of the present disclosure subsequently to FIG. 14B.

Furthermore, as shown in FIG. 14C, the fixing portion 1030 of the robot arm 1010A moves clockwise rotationally around the center of the flexible body 1040 while gradually moving to the right. By the operation, the second end 1042 of the flexible body 1040 is in tight contact with the peripheral portion 1051a of the insertion opening 1051, and the second end 1042 is ready to be inserted into the insertion opening 1051. At this time, both the ends 1041 and 1042 of the flexible body 1040 are constrained, and the flexible body 1040 is transformed to be convexly bent downward. This step is a reaching step.

Figure 14D:
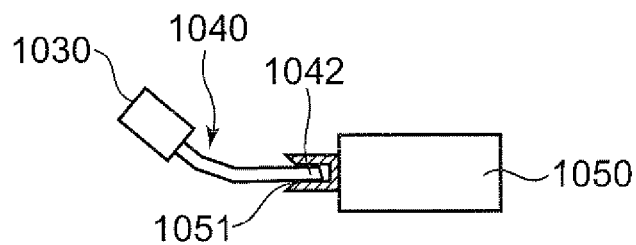
FIG. 14D is a view showing a change in degree of curvature of the flexible body in the teaching state and the replay state in the robot apparatus according to the first embodiment of the present disclosure subsequently to FIG. 14C.

Finally, as shown in FIG. 14D, the fixing portion 1030 of the robot arm 1010A slightly moves to the right while maintaining a rotating angle (tilt angle with respect to the insertion opening 1051) in the reaching step, and the second end 1042 of the flexible body 1040 is deeply inserted into the insertion opening 1051. This step is a completion step. The flexible body 1040 in the step in FIG. 14D is bent more sharply than that in the step in FIG. 14C.

In this manner, when teaching data generated by the teaching device 1000AT on the basis of information of an evaluation acquired by the curvature acquiring unit 2030 is replayed by the replay control unit 1094A, a task such as an inserting task of the flexible body 1040 that is difficult in a conventional technique can be accurately performed.

In the first embodiment, with the process of the robot arm 1010A by the management unit 1012A, in teaching in the robot apparatus 1000A, the curvature acquiring unit 2030 evaluates a degree of curvature of the flexible body 1040 obtained when the second end 1042 of the flexible body 1040 is inserted into the insertion opening 1051. This evaluation can be used as a rough indication of a success rate when the performed teaching is replayed.

A manipulator can know the evaluation of the performed teaching by the notification unit 2060. On the basis of the evaluation of the teaching obtained in the notification unit 2060, the manipulator can determine whether the teaching is further continued or the teaching is ended. For example, when the evaluation is not improved even though the manipulator performs teaching many times (for example, about 5 times), the manipulator decides that the further teaching is repeated in vain, and the manipulator can stop the teaching.

When reference information is given from the notification unit 2060, by using the reference information from the notification unit 2060 as a reference even in the case that the evaluation is not improved, the reference information can be defined as a reference to determine whether methods of teaching are changed. As the reference information from the notification unit 2060, the following information can be exemplified. For example, it is assumed that, when the evaluation is not improved even though teaching is performed many times, and the manipulator stops the teaching and replays the operation, the insertion is failed because of a low degree of curvature. In such a case, the notification unit 2060 notifies the manipulator of information representing "Please change method of gripping the operation portion," the manipulator changes the method of gripping the operation portion 1090, and performs the teaching again to make an attempt to examine whether a better evaluation can be obtained. For example, the notification unit 2060 notifies the manipulator of information representing "Please change the manipulator", and then the manipulator is replaced with another manipulator to make an attempt to examine whether a better evaluation can be obtained. For example, the notification unit 2060 notifies the manipulator of information representing "Please change the flexible body", and then the flexible body is replaced with a substitute to make an attempt to examine whether a better evaluation can be obtained, when there is a substitutable flexible body such a case that the target flexible bodies 1040 are manufactured by a plurality of companies.

With the process, the manipulator can watch a higher-level evaluation that is a high-level evaluation of the information of evaluation held in the curvature acquiring unit 2030 through the notification unit 2060. When the manipulator performs teaching a plurality of times, the evaluation can be used as a reference for the manipulator to know whether the evaluation becomes to be converged. For example, when the evaluation is not converged, the manipulator can understand there is a probability that a better evaluation can be obtained by repeating teaching. On the other hand, when the evaluation becomes to be converged, the manipulator can understand that a probability to obtain a high evaluation teaching is low even though the same teaching currently performed is repeated.

The selecting unit 2070 determines whether trajectory data having a high evaluation of a plurality of trajectory data held in the trajectory information holding unit 1095 is used in a replay. Thus, in comparison with the "configuration of direct teaching" as in FIG. 1, a replay task with a high success probability of an inserting task of the flexible body 1040 can be performed.

In the first embodiment, a clear definition of a direction of the flexible body 1040 at a certain point of the flexible body 1040 has not been described. However, when the flexible body 1040 is a line, the direction is a direction of a normal line of the line. When the flexible body 1040 is a rectangle, the direction is a tangent line of the center line along the longitudinal direction of the rectangle. As the direction of the flexible body 1040, without using the tangential direction of the flexible body 1040, a normal direction of the surface may be used as the direction of the flexible body 1040. At this time, the curvature reference holding unit 2020 does not hold information of the direction of the hole but holds information of the direction of the normal direction with respect to the hole. In place of Expression (3), $$F(\theta) = \frac{180 \times (|\theta|)}{\Pi} \text{ is used.} \tag{4}$$

Figure 15:
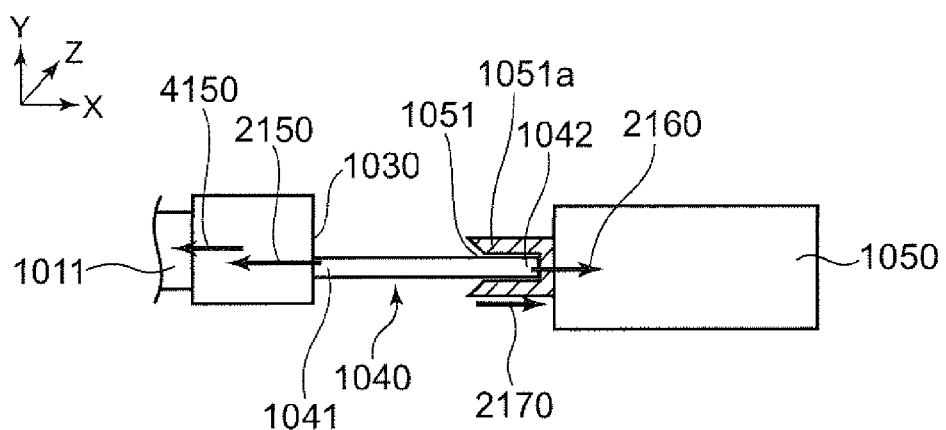
FIG. 15 is a view showing a state in which a second end of a flexible body is inserted into an insertion opening and a state in which the flexible body is not bent in the robot apparatus according to the first embodiment of the present disclosure.

The case in which the curvature reference holding unit 2020 holds information of the direction of the flexible body 1040 of the second end 1042 has been described above. However, the curvature reference holding unit 2020 may be configured to hold information of a direction of the first end 1041 of the flexible body 1040 in a state that the second end 1042 of the flexible body 1040 is inserted into the insertion opening 1051 without bending the flexible body 1040. FIG. 15 shows the state in which the second end 1042 of the flexible body 1040 is inserted into the insertion opening 1051 without bending the flexible body 1040. The manipulator may make the flexible body 1040 unbent and register the orientation of the first end 1041 of the flexible body 1040 at this time in the curvature reference holding unit 2020. At this time, in place of Expression (3), $$F(\theta) = \frac{180 \times (|\theta|)}{\Pi} \tag{5}$$

may be used. At this time, the angle $\theta$ is an angle between a "direction of the first end when the flexible body is unbent" and a "direction of the first end at a point of time acquired by the position/orientation acquiring unit 1013.". When an absolute value 101 of the angle $\theta$ decreases, the direction of the first end 1041 at that point of time is close to the "direction of the first end when the flexible body is unbent." Thus, the flexible body 1040 is unbent. When the absolute value $|\theta|$ of the angle $\theta$ increases, the direction of the first end 1041 at that point of time is deviated from the "direction of the first end when the flexible body is unbent." Thus, the flexible body 1040 is bent.

The curvature reference holding unit 2020 may be configured to hold a position (X_P, Y_P, Z_P) of the first end 1041 of the flexible body 1040 when the second end 1042 of the flexible body 1040 is inserted into the insertion opening 1051 without bending the flexible body 1040. More specifically, the curvature reference holding unit 2020 holds information of the position of the first end 1041 of the flexible body 1040 in FIG. 15. A distance between a "position of the first end acquired by the curvature acquiring unit 2030 from the position/orientation acquiring unit" and a "position held by the curvature reference holding unit 2020" may be evaluated as an evaluation of a degree of curvature.

When the distance decreases, the position of the first end at that point of time is close to the "position of the first end when the flexible body is unbent". Thus, the flexible body 1040 is unbent. When the distance increases, the position of the first end 1041 of the flexible body 1040 at that point of time is a position deviated from the "position of the first end when the flexible body is unbent". Thus, the flexible body 1040 is bent.

The management unit 1012A in the first embodiment exhibits a configuration in which an evaluation of a degree of curvature acquired by the curvature acquiring unit 2030 is notified after the reaching decision unit 2010 decides reaching. However, in the above configuration, since the evaluation has been determined at the point of time the notification is performed, during this manipulation, the manipulator cannot take an action to improve the evaluation in the manipulation.

Thus, a configuration that performs evaluation and notification before the reaching decision unit 2010 decides reaching may be used. When the evaluated value obtained at this time is a value having a ranking lower (worse) than a predetermined ranking of the evaluations held in the evaluation holding unit 2050, the notification unit 2060 may be configured to perform notification such as screen notification or audio notification of "Please bend flexible body more sharply".

Figure 16:
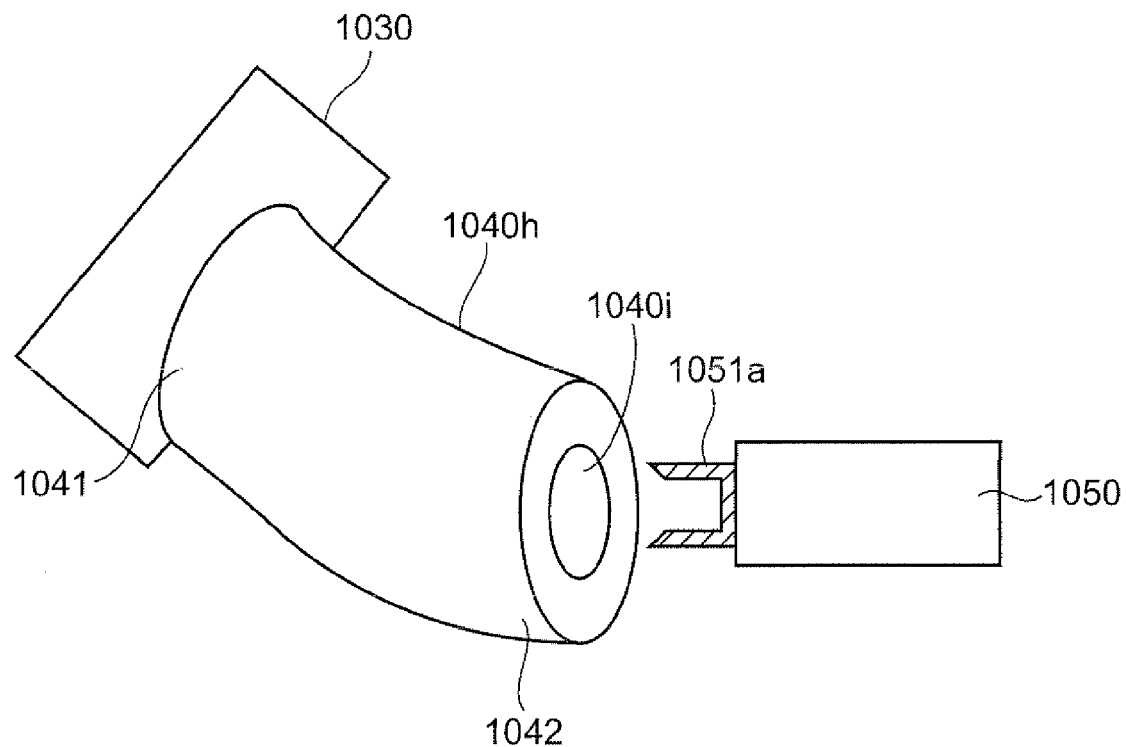
FIG. 16 is a view showing a case in which a flexible body is a cylindrical tube in the robot apparatus according to the first embodiment of the present disclosure.

The flexible body 1040 is described on the assumption that a plate-like flexible body is brought into contact with the periphery of an insertion opening of a rigid body and then, while curving a part of the flexible body, inserted into the insertion opening 1051. As a concrete example of such a flexible body 1040, a plate-like flexible circuit board or a cylindrical tube or cable may be used. FIG. 16 is a view showing a case in which the flexible body 1040 is a cylindrical tube 1040h. The flexible body 1040h serving as a cylindrical tube is the same as that in the first embodiment except that an opening 1040i of the second end 1042 is covered on the outside of the peripheral portion 1051a of the insertion opening 1051. On the other hand, as the thing 1050, a connection tube etc. connected to a flexible circuit board by inserting a connector, a tube, or a cable of a circuit board etc. electrically connected to the flexible circuit board can be exemplified.

According to the first embodiment, when the flexible body 1040 reaches the insertion opening 1051 of the thing 1050 and when teaching is performed to perform insertion control after a manipulation of bending the flexible body 1040 is performed, the curvature acquiring unit 2030 acquires evaluation information of a degree of curvature of the flexible body 1040. On the basis of the evaluation information of the degree of curvature acquired by the curvature acquiring unit 2030, when the flexible body 1040 reaches the insertion opening 1051, it is decided whether teaching data obtained by teaching satisfies teaching to insert the flexible body 1040 after a manipulation of bending the flexible body 1040, and, on the basis of the evaluation information acquired by the curvature acquiring unit 2030, the notification unit 2060 can give a predetermined notice about the teaching. In place of the notice, on the basis of the evaluation information acquired by the curvature acquiring unit 2030, the selecting unit 2070 can select teaching having the high evaluation from a plurality pieces of teaching data. As a result, the teaching having a higher evaluation can be used, and teaching data by which a task of handling the flexible body 1040 can be accurately performed can be acquired, and a task such as an inserting task of the flexible body 1040 that is difficult in the conventional technique can be accurately performed.

<Another Configuration of Reaching Decision Unit>

The first embodiment shows a configuration in which, in the reaching decision unit 2010, time at which a force acquired by the second force sensor 1021 is stronger than a predetermined force is regarded as time at which the reaching step is obtained, and, at this time (thereafter), the curvature acquiring unit 2030 acquires a curvature evaluation. In contrast to this, in the other configuration, in place of the configuration in the first embodiment, in the reaching decision unit 2010, time at which a predetermined period of time (for example, 100 ms) has been passed since the force acquired by the second force sensor 1021 is stronger than the predetermined force is regarded as a time at which the reaching step is obtained. More specifically, after the predetermined period of time has been elapsed since the force acquired by the second force sensor 1021 is stronger than the predetermined force, a curvature evaluation is acquired by the curvature acquiring unit 2030.

In the configuration, in addition to the units in the first embodiment, a time acquiring unit 2040 and a timer unit 2050 are used (see FIG. 7).

The time acquiring unit 2040 acquires time. For example, time acquisition is realized by using a counter circuit.

The timer unit 2050 is a device that performs notification when a designated time is elapsed since the start of time measurement is designated. Specifically, for example, the timer 2050 receives the notice of the start of measurement from the outside, acquires time from the time acquiring unit 2040, and subsequently, continuously acquires time (or counter values) from the time acquiring unit 2040, and decides whether a designated period of time has elapsed. When the timer 2050 decides that the designated period of time has elapsed, the timer 2050 notifies the outside of the elapse of time.

More specifically, for example, at time (time at which a force acquired by the second force sensor 1021 is stronger than a predetermined force) at which the second end 1042 of the flexible body 1040 is brought into contact with the peripheral portion 1051a of the insertion opening 1051, the timer unit 2050 is instructed to start measurement, and a curvature evaluation is acquired from the curvature acquiring unit 2030 in response to the notice of the elapse of the predetermined period of time from the timer unit 2050.

<First Modification>

Figure 17:
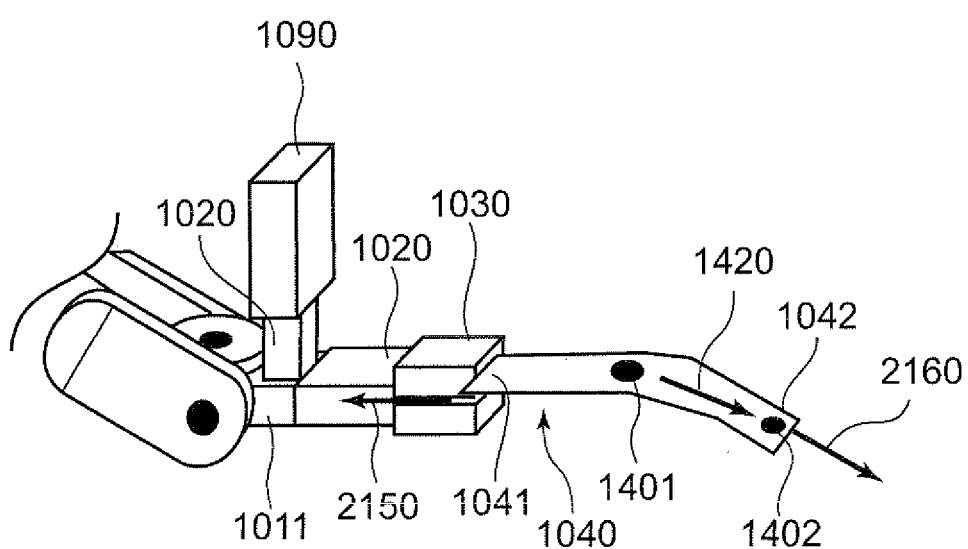
FIG. 17 is a view showing a front end of a robot arm and a flexible body in a first modification of the first embodiment of the present disclosure.

An evaluation of a degree of curvature by the curvature acquiring unit 2030 described in the first embodiment represents an example of a method of acquiring an evaluation of a degree of curvature. Another method may be used. In the first modification of the first embodiment, the curvature acquiring unit 2030 is configured as a curvature acquiring unit 2030C including a multi-view camera 1520 serving as an example of a photographing device and characteristic point extracting unit (image processing unit) 1525 that processes an image taken by the multi-view camera 1520, and an evaluation of a degree of curvature is acquired by image processing. FIG. 17 is a view showing a front end of the robot arm 1010A and the flexible body 1040 in the first modification.

Characteristic points 1401 and 1402 are characteristic points provided to acquire a degree of curvature of the flexible body 1040 by image processing. The characteristic point 1402 is a characteristic point provided on the second end 1042 of the flexible body 1040, and the characteristic point 1401 is a characteristic point provided at a center position (intermediate position between the first end 1041 and the second end 1042) of the flexible body 1040. The characteristic points 1401 and 1402 are formed such that the normal flexible body 1040 is circularly painted with permanent markers having different colors. In this case, it is assumed that the characteristic point 1401 is in red, and the characteristic point 1402 is in green. It is assumed that a task space does not include a red or green thing except for the characteristic points 1401 and 1402.

Figure 18:
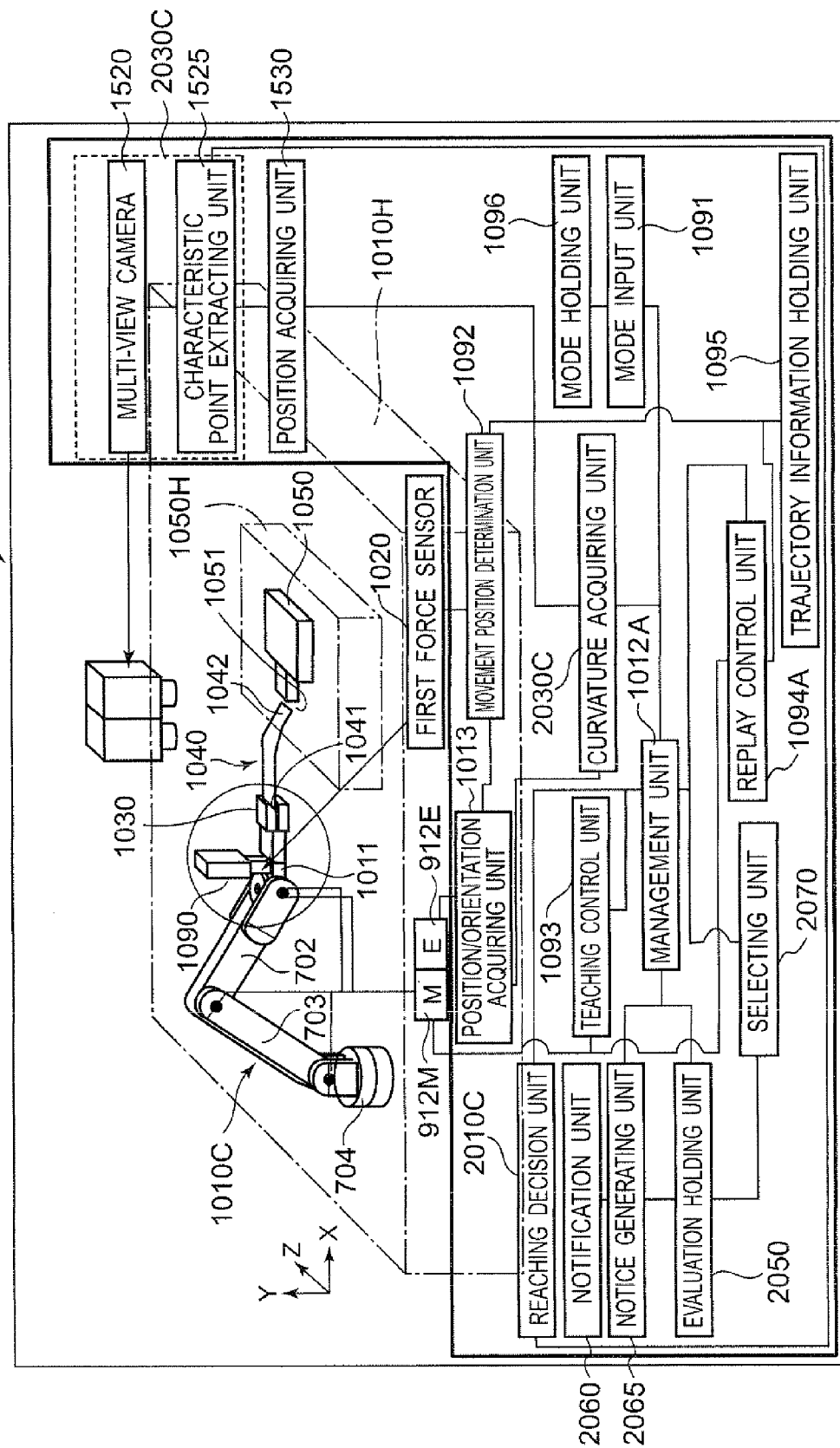
FIG. 18 is a view showing a configuration of a robot apparatus in the configuration of the first modification of the first embodiment of the present disclosure.

FIG. 18 is a view showing a configuration of a robot apparatus 1000C in this configuration. Like the robot apparatus 1000A in the first embodiment, the robot apparatus 1000C uses a robot arm 10100 having the same structure as that of the robot arm 1010A to teach or to teach and replay a task of inserting the second end 1042 of the flexible body 1040 into the insertion opening 1051 fixed to the thing 1050. In FIG. 18, the same elements as the constituent elements shown in FIG. 7 are the same as those in the description of the configuration in the first embodiment. Elements in FIG. 18 different from the elements in FIG. 7 will be described below.

The multi-view camera 1520 is a color camera that photographs the characteristic points 1401 and 1402. In this case, the multi-view camera 1520 is a stereoscopic camera fixed to the task space.

The characteristic point extracting unit 1525 extracts the characteristic points 1401 and 1402 from images photographed by the multi-view camera 1520 and extracts the front end of the flexible body 1040 on the basis of the extracted characteristic points 1401 and 1402 of the front end of the flexible body 1040. As a method of extracting the characteristic points 1401 and 1402 by the characteristic point extracting unit 1525, a large number of methods are known. A simple example is described here. When the characteristic point 1401 is acquired, first, a photographed image of the multi-view camera 1520 is binarized, and then, a red region is extracted by the characteristic point extracting unit 1525. The characteristic point extracting unit 1525 decides whether pixels of the photographed image are red components. The characteristic point extracting unit 1525 assigns 1 to pixels that are decided as in red, and assigns 0 to pixels that are not decided as in red. In this case, a pixel in which a brightness of a red component is a threshold value or more and brightnesses of blue and green components are threshold values or less is decided as a red pixel by the characteristic point extracting unit 1525.

Although several red regions (regions to which 1 is assigned) are created in the image, a region having the maximum area of the regions is regarded as the region of the characteristic point 1401 by the characteristic point extracting unit 1525, a center of gravity of the region is defined as a position on the image of the characteristic point 1401 in the characteristic point extracting unit 1525. With respect to the characteristic point 1402, similarly, a green region is extracted by the characteristic point extracting unit 1525, and a position is calculated by the characteristic point extracting unit 1525. The characteristic point extracting unit 1525 outputs the positions of the characteristic points 1401 and 1402 in the stereoscopic images to a position acquiring unit 1530, which will be described later.

When the area of the region of the characteristic point 1402 is smaller than a predetermined threshold value, the characteristic point extracting unit 1525 decides that the characteristic point 1402 cannot be extracted. The decision result is output to the curvature acquiring unit 2030C through the position acquiring unit 1530. When the second end 1042 of the flexible body 1040 is inserted into the insertion opening 1051, the characteristic point 1402 is not photographed by the multi-view camera 1520 and cannot be extracted because the characteristic point 1402 is inserted into the insertion opening 1051. When the second end 1042 of the flexible body 1040 is brought into contact with the peripheral portion 1051a of the insertion opening 1051, the characteristic point 1402 is not photographed by the multi-view camera 1520 and cannot be extracted because the characteristic point 1402 is hidden by the insertion opening 1051.

The position acquiring unit 1530 calculates a position (X1, Y1, Z1) of the characteristic point 1401 and a position (X2, Y2, Z2) of the characteristic point 1402 from the stereoscopic image acquired by the multi-view camera 1520. The position acquisition is performed by the position acquiring unit 1530 by a method of extracting a position using a normal stereoscopic image, and information of the acquired position is output from the position acquiring unit 1530 to the curvature acquiring unit 2030C.

The curvature acquiring unit 2030C evaluates a degree of curvature on the basis of the position of the characteristic point 1402 calculated by the position acquiring unit 1530 and a position of the arm tip 1011.

In the first embodiment, the direction 2160 of the front end on the second end 1042 side in FIG. 5A is approximated by using the hole direction 2170 of the insertion opening 1051. However, in the configuration, the direction 2160 of the second end 1042 in FIG. 17 is approximated by a vector 1420. The vector 1420 is a vector having the characteristic point 1401 and the characteristic point 1402 as a start point and an end point, respectively. More specifically, when the vector 1420 having a middle of the flexible body 1040 as a start point and the second end 1042 of the flexible body 1040 as an end point is regarded as the direction 2160 of the front end on the second end 1042 side, an evaluation of a degree of curvature can be calculated by the curvature acquiring unit 2030C as in the first embodiment.

When the position of the characteristic point 1401 and the position of the characteristic point 1402, which are acquired by the position acquiring unit 1530, are given as (X1,Y1, Z1) and (X2, Y2, Z2), respectively, the vector 1420 is calculated as (X2−X1, Y2−Y1, Z2−Z1) by the curvature acquiring unit 2030C.

At this time, the angle θ between the direction 2150 of the front end on the first end 1041 side and the vector 1420 can be calculated by the curvature acquiring unit 2030C by replacing $(T_X, T_Y, T_Z)$ of Expression (2) with (X2−X1,Y2−Y1, Z2−Z1) to obtain $$\theta = \arccos\left(\frac{\alpha_X(X2-X1)+\alpha_Y(Y2-Y1)+\alpha_X(Z2-Z1)}{\sqrt{\alpha_X^2+\alpha_Y^2+\alpha_Z^2}\sqrt{(X2-X1)^2+(Y2-Y1)^2+(Z2-Z1)^2}}\right). \quad (6)$$

The evaluation F(θ) of the degree of curvature is also the same as Expression (3) as in the first embodiment.

A reaching decision unit 2010C decides whether the second end 1042 of the flexible body 1040 reaches the inlet of the insertion opening 1051. Specifically, when the characteristic point extracting unit 1525 cannot extract the characteristic point 1402, it is decided that the second end 1042 of the flexible body 1040 reaches the insertion opening 1051.

Next, the configuration in which the vector 1420 in FIG. 17 is acquired by the position acquiring unit 1530 (and the characteristic point extracting unit 1525) has been described. However, by the same manner as described above, the vector 2150 serving as a direction of the front end on the first end 1041 side may be configured to be acquired by the position acquiring unit 1530 (and the characteristic point extracting unit 1525).

According to the first modification, the same advantages as those described in the first embodiment can be obtained. In particular, in the first modification, since reaching detection is performed without using the second force sensor 1021, even though the flexible body 1040 is in contact with the peripheral portion 1051a of the insertion opening 1051 with a weak force and the force cannot be detected by the second force sensor 1021, the same advantages as those in the first embodiment can be obtained.

<Another Configuration of Notification Unit>

In the configuration of the first embodiment, the notification unit 2060 is a display. However, the notification unit 2060 may be a loudspeaker that outputs contents to be displayed on the display as voice. In this case, the notice generating unit 2065 synthesizes a corresponding audio output. The notification unit 2060 may have a configuration that performs both notification by a display and notification by voice.

The use of such a configuration provides an environment in which a manipulator can more easily perform the task.

<Second Modification>

Figure 19:
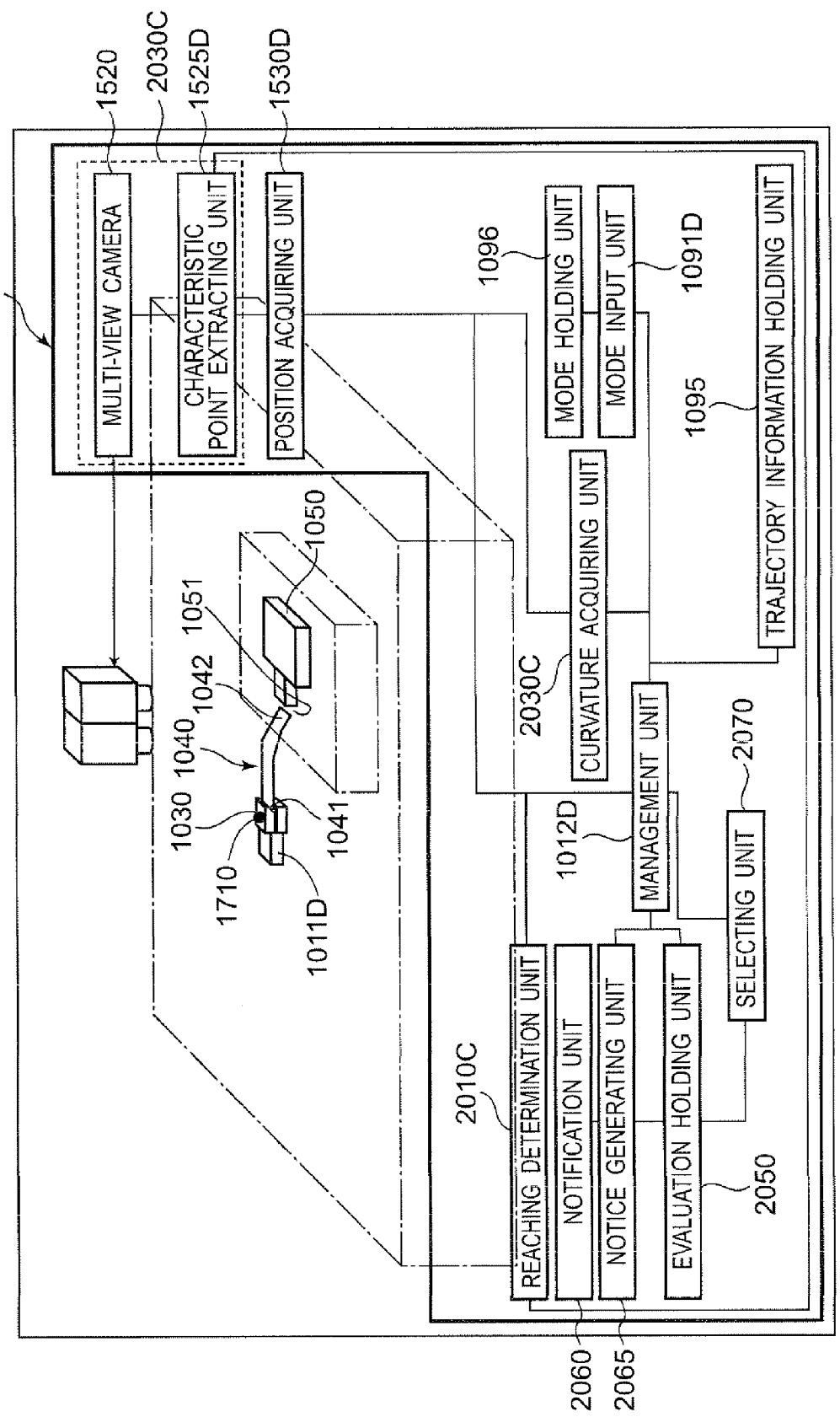
FIG. 19 is a view showing a configuration of a teaching device in a second modification of the first embodiment of the present disclosure.

In the first modification of the first embodiment, the case in which teaching and replay are performed by using the same device (robot apparatus 1000A) has been described. However, the teaching and the replay can be performed by different devices, respectively. FIG. 19 is a view showing a configuration of a teaching device 1000D in the second modification of the first embodiment. Since the units having the same reference numerals as those in the first modification have the same functions as those in the first modification, a description thereof will be omitted. Parts different from the first modification will be described below. The teaching device 1000D does not include a robot arm.

The arm tip 1011D is not an arm tip of a robot arm, but a portion gripped by a manipulator in a teaching state. In the first embodiment and the first modification, the operation portion 1090 is coupled to the edge of the arm tip 1011. However, in the second modification, since an arm tip 1011D is directly gripped and moved by a manipulator, an operation portion is not provided.

A characteristic point 1710 is a characteristic point provided on the fixing portion 1030. Specifically, the characteristic point is a point painted in blue with a permanent marker or the like. It is assumed that, in a working environment, a blue thing is not placed except for the characteristic point 1710.

The characteristic point extracting unit 1525D extracts the position of the characteristic point 1710 on an image, in addition to the characteristic points 1401 and 1402. The other configurations are the same as those in the characteristic point extracting unit 1525.

A position acquiring unit 1530D extracts the position of the characteristic point 1710 in addition to the characteristic points 1401 and 1402. The other configuration is the same as that in the position acquiring unit 1530. In the second modification, the position of the characteristic point 1710 is regarded as the position of the arm tip 1011D, and, as in the configuration in which the position/orientation acquiring unit 1013 acquires the position of the arm tip 1011 of the robot arm 1010 in the first embodiment, the position acquiring unit 1530D acquires the position of the arm tip 1011D.

A mode input unit 1091D inputs a processing mode performed by the robot arm 1010. Since the teaching device 1000D is not used in replay, "replay is performed" cannot be selected. The teaching device 1000D is used when any one of two options "teaching is performed" and "not execute" is selected.

A management unit 1012D manages an entire operation of the teaching device 1000D.

<Flow of Processes of Robot Arm 1010A>

Figure 20:
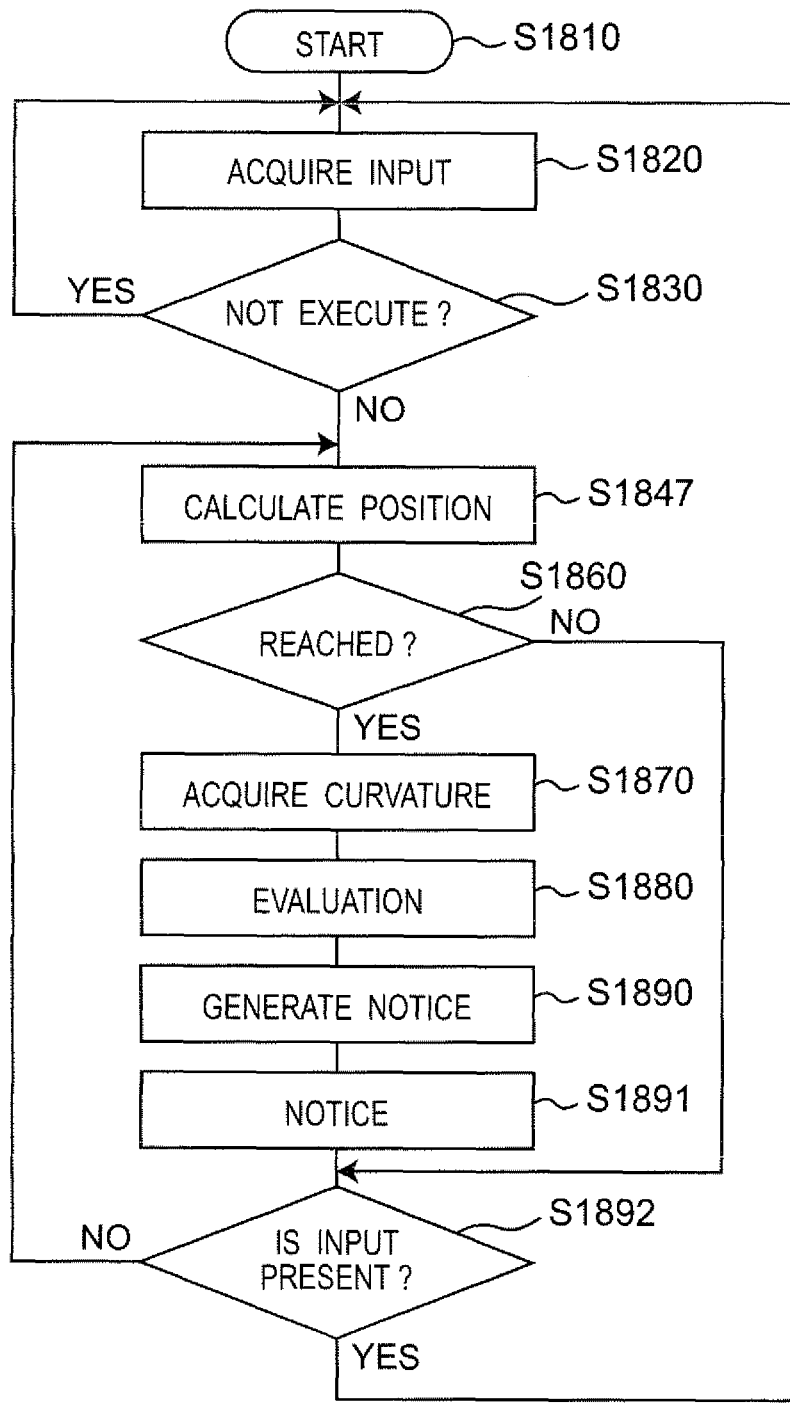
FIG. 20 is a flowchart showing a flow of processes of a robot arm by a management unit of the teaching device in the second modification of the first embodiment of the present disclosure.

A flow of processes of the robot arm 1010A by the management unit 1012D will be described below with reference to FIG. 20.

Firstly, in step S1810, the management unit 1012D starts the processes.

Next, in step S1820, the management unit 1012D acquires a notice from the mode input unit 1091D. More specifically, the management unit 1012D acquires, from the mode input unit 1091D, an input one of two process modes "teaching is performed" and "not execute" performed by the manipulator through the robot arm 1010A.

In step S1830, the management unit 1012D performs branching by the acquired notice. More specifically, when the acquired notice is "0" representing "not execute", the flow is branched to step S1820. When the notice is "teaching is performed", the flow is branched to step S1847.

In step S1847, the management unit 1012D acquires the position (position of the characteristic point 1710) of the arm tip 1011D from the position acquiring unit 1530D and stores the position in the trajectory information holding unit 1095.

Next, in step S1860, the reaching decision unit 20100 decides whether the second end 1042 of the flexible body 1040 reaches the insertion opening 1051. When the reaching decision unit 20100 decides the reaching, the flow is branched to step S1870. When the reaching decision unit 2010C does not decide the reaching, the flow is branched to step S1892. In the case that the reaching has been decided since the teaching is started, the flow is branched to step S1892.

In step S1870, after the reaching decision unit 20100 decides the reaching, the curvature acquiring unit 2030C acquires an evaluation of a degree of curvature of the flexible body 1040.

As an example, when the reaching decision unit 20100 decides the reaching, a reaching decision signal is input from the reaching decision unit 2010C to the management unit 1012D, and the management unit 1012D inputs, to the curvature acquiring unit 20300, a command to acquire a degree of curvature of the flexible body 1040. On the basis of the information of the position acquiring unit 1530D, the curvature acquiring unit 20300 acquires information of evaluation of a degree of curvature of the flexible body 1040 and outputs the acquired information of the degree of curvature of the flexible body 1040 to the management unit 1012D.

Next, in step S1880, the management unit 1012D stores the evaluation of the degree of curvature acquired by the curvature acquiring unit 20300 in step S1870 in the evaluation holding unit 2050.

Next, in step S1890, the notice generating unit 2065 generates a display screen such as evaluation information to be given to the manipulator through the notification unit 2060. For example, a process corresponding to the process in FIG. 12 is performed.

Next, in step S1891, the notification unit 2060 displays the display screen generated by the notice generating unit 2065 on a display.

Next, in step S1892, branching is performed depending on whether the mode input unit 1091D outputs a new notice to the management unit 1012D. More specifically, when a notice is not newly output from the mode input unit 1091D to the management unit 1012D (when a new input is not performed to the mode input unit 1091D), the flow is branched to step S1847 to continue teaching. When the notice is newly output from the mode input unit 1091D to the management unit 1012D, the flow is branched to step S1820 to perform a process depending on the input.

According to the second modification, the same advantages as those described in the first embodiment can be obtained. In particular, in the second modification, a device that performs teaching has a simple configuration. Thus, for example, even though the number of manipulators each having a technique to perform teaching is very small, when a teaching device must be taken in to the manipulator, the take-in task can be easily performed. Since the device that performs teaching has a simple structure, a large number of manipulators perform manipulations, and teaching having the highest evaluation can be selected as teaching to be finally used from teachings by the manipulations.

<Third Modification>

In the first embodiment, the configuration in which the replay control unit 1094A uses teaching data having the highest evaluated value has been described. However, as the third modification of the first embodiment, a configuration in which a trajectory obtained by averaging top N (N is an integer that is 2 or more) teaching data having higher evaluations in the management unit 1012A is replayed may be used. At this time, a configuration in which an average is calculated by the management unit 1012A in each of the steps in FIGS. 3A to 3D may be used. For example, the steps performed until the flexible body 1040 is brought into contact with the peripheral portion 1051a of the insertion opening 1051 are averaged in a plurality of teaching by the management unit 1012A.

When the configuration is used, a fluctuation (variation) in the respective teaching can be absorbed, and a success rate of insertion can be improved.

<Fourth Modification>

As a fourth modification of the first embodiment, a configuration that automatically determines until when teaching is repeated may be used. For example, a configuration in which a desired evaluated value holding unit that holds in advance an evaluated value serving as a desired value is provided to repeat teaching in the management unit 1012A until the evaluation that is equal to or larger than the evaluated value serving as the desired value is obtained may be used. A configuration in which the notification unit 2060 performs notification to recommend that teaching is continued until the evaluation that is equal to or larger than the evaluated value serving as the desired value is obtained may be used.

Figure 25:
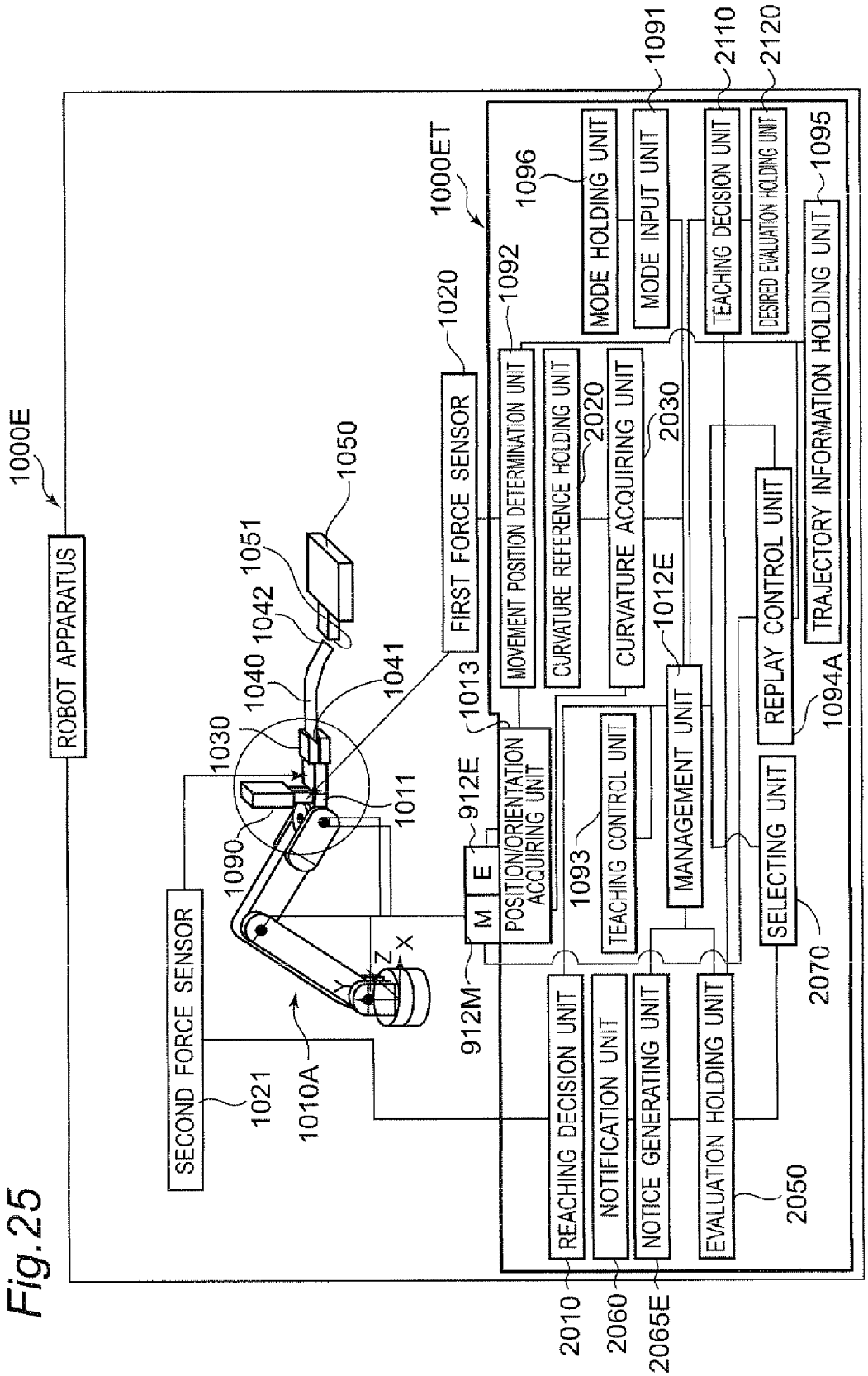
FIG. 25 is a view showing a configuration of a robot apparatus in the fourth modification of the first embodiment of the present disclosure.

FIG. 25 is a view showing a configuration of a robot apparatus 1000E including a teaching device 1000ET in the fourth modification. Since the parts having the same reference numerals as those in the first embodiment are the same elements as those in the first embodiment, a description thereof will be omitted. The different parts will be described below.

A desired evaluated value holding unit 2120 holds an evaluated value serving as a desired value in advance.

A teaching decision unit 2110 compares an evaluated value acquired by a management unit 1012E with a desired evaluated value acquired by the desired evaluated value holding unit 2120. When the latter is large, a decision of teaching continuation is performed; otherwise, a decision of the teaching end is performed to output a decision result to the management unit 1012E.

A notice generating unit 2065E generates an image, voice, or the like to notify a manipulator that the teaching is continued. In this case, as an example, the notice generating unit 2065E generates an image of a character string "Teaching is continued. The robot moves to an initial position."

The management unit 1012E performs the process performed by the management unit 1012 in the first embodiment and allows the teaching decision unit 2110 to decide whether teaching is continued or ended. When the teaching is continued, the notice generating unit 2065 generates a notice to continue the teaching.

Figure 24:
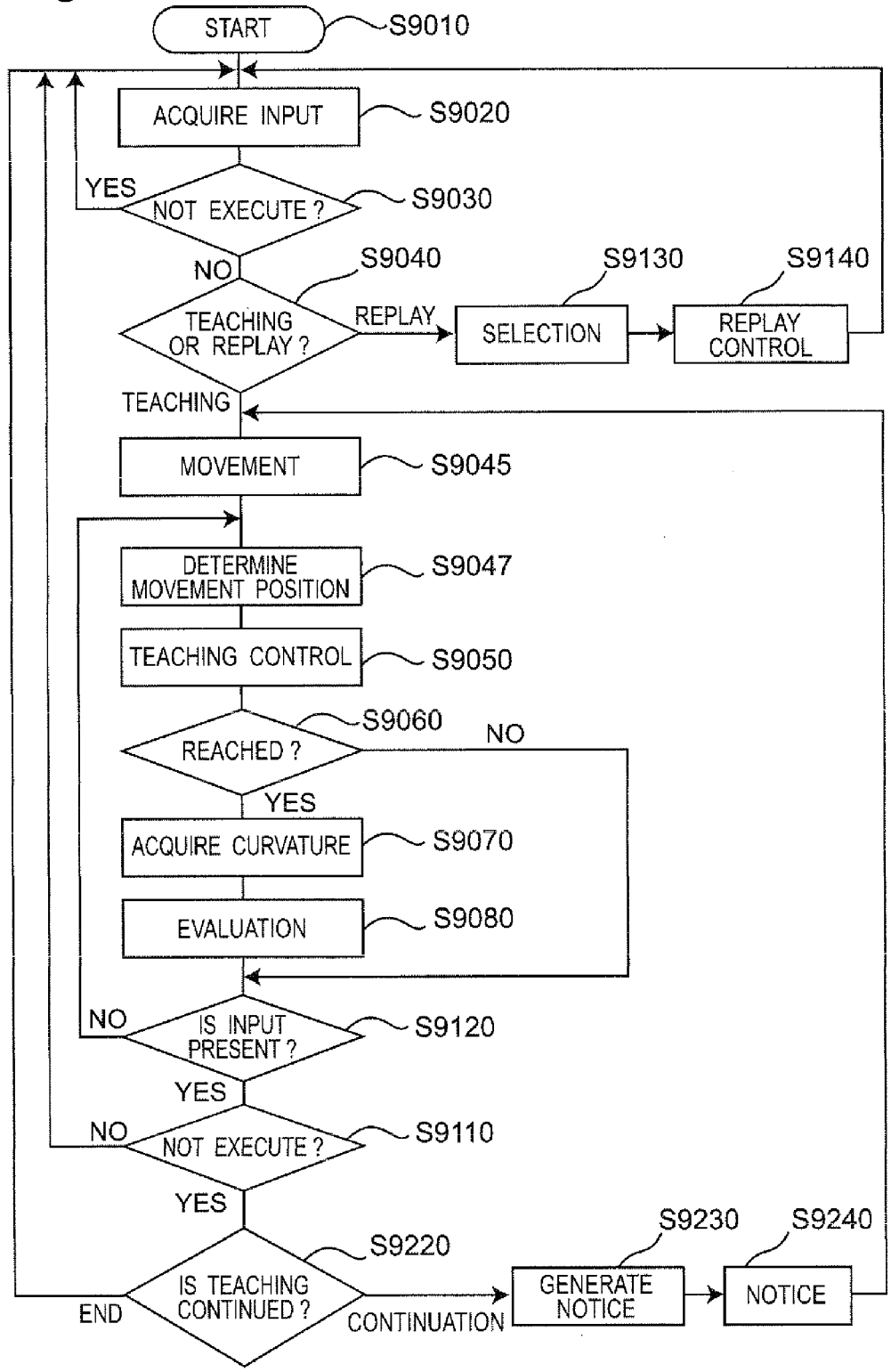
FIG. 24 is a flowchart showing a flow of processes performed by a management unit in a fourth modification of the first embodiment of the present disclosure.

A flow of processes performed by the management unit 1012E will be described below with reference to FIG. 24. Since the steps from step S9010 to step S9080 are the same as the steps from step S9010 to step S9080 in FIG. 13 in the first embodiment, a description thereof will be omitted. The different parts will be described below.

In step S9120 after step S9080, the management unit 1012A decides whether a new output from the mode input unit 1091 to the management unit 1012A is present. When a new output from the mode input unit 1091 to the management unit 1012A is present, the flow is branched to step S9210. When a new output to the management unit 1012A is not present, the flow is branched to step S9047. Steps subsequent to step S9047 are the same as those in the first embodiment.

Next, in step S9210, branching is performed on the basis of the contents of a notice given as a new output from the mode input unit 1091 to the management unit 1012E. More specifically, when a notice representing "not execute" is given from the mode input unit 1091 to the management unit 1012A, the flow is branched to step S9220. In other cases, the flow is branched to step S9020.

In step S9220, the management unit 1012E performs a process of teaching decision by using the teaching decision unit 2110. When a decision to continue teaching is output from the teaching decision unit 2110 to the management unit 1012E, the flow is branched to step S9230. When a decision not to continue teaching is output from the teaching decision unit 2110 to the management unit 1012E, the flow is branched to step S9020.

In step S9230, the management unit 1012E allows a notice generating unit 2055E to generate a notice. As an example, the notice generating unit 2055E generates an image of a character string "Teaching is continued. The robot moves to an initial position."

Next, in step S9240, the management unit 1012E allows the notification unit 2060 to notify that the contents of a notice generated by the notice generating unit 2055E. In this case, the notification unit 2060 is a display to display an image of a character string "Teaching is continued. The robot moves to an initial position." Upon completion of step S9240, the management unit 1012E branches the process to step S9045.

The configuration that does not generate a notice when the teaching decision unit decides that the teaching is not continued is described here. In this case, a display representing that an evaluated value is larger than the desired evaluated value may be performed on the notification unit 2060 through the notice generating unit 2065.

When the top Nth value (N is an integer that is 2 or more) of the evaluation held in the evaluation holding unit 2050 is larger than a desired value, the teaching decision unit 2110 may decide that teaching is ended, and otherwise, the teaching decision unit 2110 may decide that teaching is continued. When the teaching is ended, the management unit 1012E may be configured to use an average data generating unit (not shown) and to store teaching data obtained by averaging top N teaching data as teaching data for replay in the trajectory information holding unit 1095.

The teaching decision unit 2110 may be configured to calculate a variance value of top N (N is an integer that is 2 or more) evaluations held in the evaluation holding unit 2050. When the calculated value is a predetermined value or less, the teaching decision unit 2110 performs decision of the teaching end. In other cases, the teaching decision unit 2110 may perform decision of the teaching continuation. The notification unit 2060 may be configured to notify of the variance. In this configuration, the desired holding unit 2120 holds the predetermined value.

With the above configuration, a time and effort of determining the number of times of teaching can be saved, and the number of ineffective teaching tasks can be reduced.

<Fifth Modification>

In the first embodiment, the reaching decision in the reaching decision unit 2010 is performed on real time. However, the following configuration may be used. That is, in addition to a position and an orientation, the value of the second force sensor 1021 are recorded in the trajectory information holding unit 1095 through the movement position determination unit 1092, and, after the teaching ends, on the basis of the information recorded in the trajectory information holding unit 1095, reaching decision is performed by the reaching decision unit 2010. In this case, in the block diagram in FIG. 7, the reaching decision unit 2010 and the trajectory information holding unit 1095 need to be connected by a connection line to make it possible to input/output information.

The reaching decision may be performed by using, in addition to the value of the second force sensor 1021, the velocity or acceleration of the arm tip 1011. The velocity or acceleration of the arm tip 1011 can be calculated by the movement position determination unit 1092 on the basis of the position of the arm tip 1011 and time at which the information of the position is acquired.

The reaching decision is performed on the basis of the value of the second force sensor 1021 attached to the arm tip 1011. However, the second force sensor 1021 may be attached to the thing 1050 or a periphery of the insertion opening 1051, and the reaching decision may be performed on the basis of the information acquired by the second force sensor 1021. By using a camera that photographs the periphery of the insertion opening 1051 and an image processing unit, the reaching decision may be performed with image processing.

When the configuration is used, the reaching decision can be more accurately performed.

<Sixth Modification>

In the first embodiment, the curvature reference holding unit 2020 holds information of the hole direction 2170 of the insertion opening 1051. It is decided that, when the direction of the first end 1041 is deviated from the hole direction 2170 of the insertion opening 1051, a degree of curvature of the flexible body 1040 is large.

Figure 21:
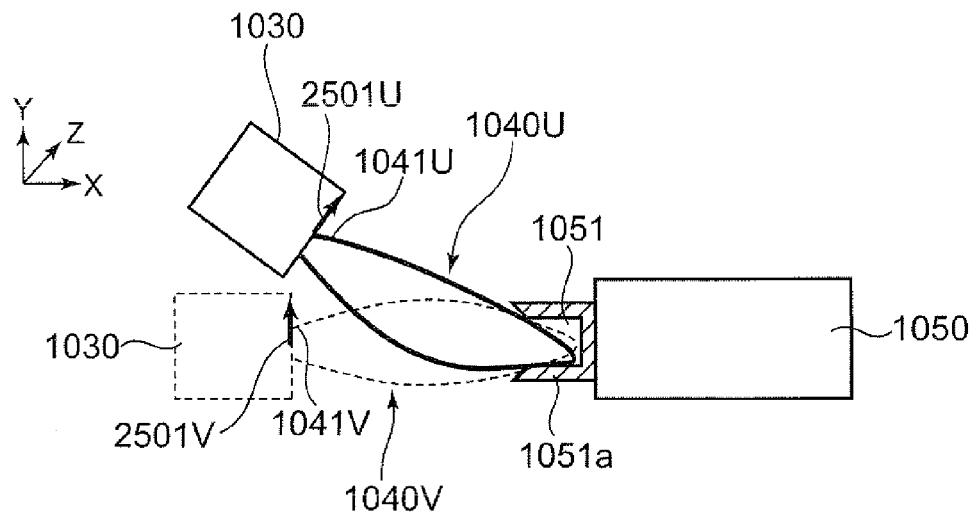
FIG. 21 is a view showing a degree of curvature of a flexible body having a rugby-ball shape (a shape having an expanded portion at the middle) in a sixth modification of the first embodiment of the present disclosure.

In contrast to this, the curvature reference holding unit 2020 is configured to hold information of an orientation of an (ideal) first end 1041 serving as a reference used when the flexible body 1040 bends and to perform evaluation in the curvature acquiring unit 2030 by examining a proximity of the orientation of the actual first end 1041 to the ideal orientation. Information of the orientation of the (ideal) first end 1041 serving as a reference used when the flexible body 1040 bends may be configured to be registered in the curvature reference holding unit 2020 in advance, or to be acquired by the curvature acquiring unit 2030 from an orientation in an insertion completion step. FIG. 21 is a view showing a degree of curvature of a flexible body 1040U (shape having an expanded portion at the middle) having a rugby-ball shape. The flexible body 1040U indicated by a solid line is a bent flexible body 1040U, and a flexible body 1040V indicated by a dotted line is an unbent flexible body 1040V. Reference numeral 2501U denotes a normal direction of the first end 1041U of the bent flexible body 1040U, and reference numeral 2501V denotes a normal direction of the first end 1041V of the unbent flexible body 1040V. In the curvature reference holding unit 2020, a direction of the normal direction 2501V of the first end 1041V is registered as a reference. The curvature acquiring unit 2030 acquires information of evaluation of a degree of curvature by an angle between the direction 2501V held as information in the curvature reference holding unit 2020 and the direction 2501U acquired by the position/orientation acquiring unit 1013, as in the first embodiment. With the above configuration, regardless of the shape of the flexible body 1040, information of evaluation of a degree of curvature can be acquired by the curvature acquiring unit 2030.

<Seventh Modification>

A configuration that provides an actual contact decision unit that decides that the second end 1042 of the flexible body 1040 is actually brought into contact with the peripheral portion 1051a of the insertion opening 1051 to cause the notification unit 2060 to notify of the value acquired by the curvature acquiring unit 2030 through the notice generating unit 2065 until reaching is decided by the reaching decision unit after contact time may be used. An example of the actual contact decision unit may be configured to attach the second force sensor 1021 to a position near the thing 1050 or the periphery of the insertion opening 1051 and to decide an actual contact when force information detected by the second force sensor 1021 is a predetermined threshold value or more. When the curvature acquiring unit 2030 decides that the degree of curvature acquired by the curvature acquiring unit 2030 does not reach a predetermined degree of curvature, voice such as "Would you bend more sharply?" may be output by the notification unit 2060 to guide the manipulator.

A configuration that performs power-assists movement in a rotating direction of the arm tip 1011 after the actual contact decision unit decides that the second end 1042 of the flexible body 1040 is brought into contact with the insertion opening 1051 may be used.

With the configuration, teaching data by which replay is easily successfully performed can be easily acquired.

<Eighth Modification>

In the first embodiment, the task that fixes the first end 1041 of the flexible body 1040 to the fixing portion 1030 and inserts the second end 1042 of the flexible body 1040 into the insertion opening 1051 of the thing 1050 has been described. However, a configuration that fixes the peripheral portion 1051a (or the thing 1050) of the insertion opening 1051 to the fixing portion 1030 and fixes the first end 1041 of the flexible body 1040 to a place (for example, the thing placing table 1050H) except for the robot arm 1010A to perform an inserting task may be used.

<Ninth Modification>

In the first embodiment, the configuration in which, in a task of inserting the second end 1042 of the flexible body 1040 into the peripheral portion 1051a of the insertion opening 1051, insertion is performed after the second end 1042 of the flexible body 1040 is brought into contact with the peripheral portion 1051a of the insertion opening 1051 and then bent has been described. The first embodiment describes the evaluation device or the teaching device that evaluates the inserting task as a good evaluation after the second end 1042 of the flexible body 1040 is brought into contact with the peripheral portion 1051a of the insertion opening 1051 and then, the flexible body 1040 is bent.

However, the task is an example of a task of handling the flexible body 1040 to which the present disclosure can be applied. For example, the present disclosure can be applied to a task of moving a front end of the flexible body 1040 to a predetermined position of the thing 1050 (including a task not including an inserting task). In the case that the front end of the flexible body 1040 is moved to the predetermined position of the thing 1050, when the front end is controlled to be located at the predetermined position after the flexible body 1040 is brought into contact with the thing 1050 and then, the flexible body 1040 is bent, target movement is easily successful. Thus, the present disclosure can also be applied to the above task.

<Tenth Modification>

In the first modification, a method of evaluating a degree of curvature of the flexible body 1040 on the basis of an angle between directions of the flexible body 1040 at both the ends of the flexible body 1040 has been described. However, positions from which the directions are acquired are not limited to both the ends, and two different points on the flexible body 1040 may be used. In this case, a special case in which the flexible body 1040 is bent at two or more positions is excluded from the above configuration.

Figure 22:
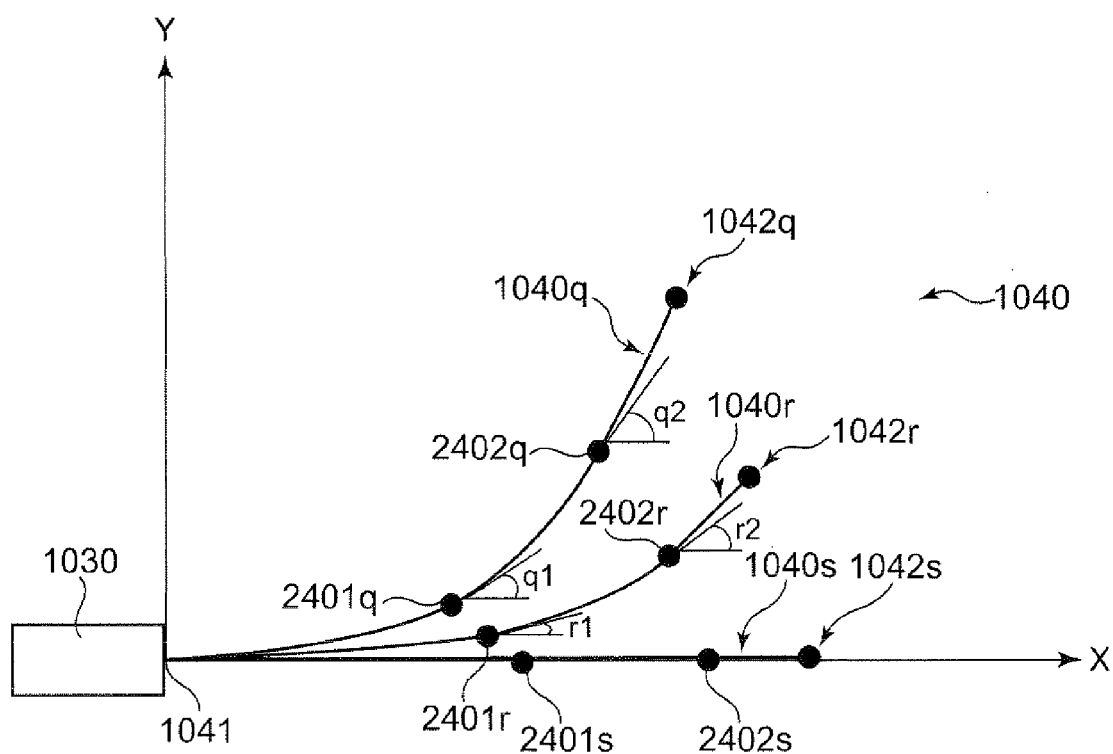
FIG. 22 is a view showing flexible bodies in various states in which the flexible body is fixed at a first end in a tenth modification of the first embodiment of the present disclosure.

A method of acquiring directions of the flexible body 1040 at two different points on the flexible body 1040 except for both the ends will be described below with reference to FIG. 22. FIG. 22 is a graph showing the flexible body 1040 fixed to the first end 1014 in various states. A flexible body 1040s in FIG. 22 exhibits an unbent state of the flexible body 1040 (straight state). The flexible body 1040r exhibits the flexible body 1040 that is slightly bent more sharply than the flexible body 1040s. The flexible body 1040q exhibits the flexible body 1040 that is slightly bent more sharply than the flexible body 1040r.

Second ends 1042q to 1042s of the flexible body 1040 correspond to the second ends 1042 of the flexible bodies 1040q to 1040s.

In FIG. 22, a direction from the first end 1041 to the second end 1042s is set to an x-axis direction, a direction vertical to the x axis is set to a y-axis direction, and the first end 1041 is set to an original point.

Points 2401q to 2401s indicate points 4 mm apart from the first ends 1041 on the flexible bodies 1040p to 1040s, respectively. Points 2402q to 2402s indicate points 8 mm apart from the first ends 1041 on the flexible bodies 1040q to 1040s, respectively. Reference symbols q1 to r1 denote angles of the tangent lines of the flexible bodies 1040q to 1040r to the x axis at the points 2401q to 2401r, respectively. Reference symbols q2 to r2 denote angles of the tangent lines of the flexible bodies 1040q to 1040r to the x axis at the points 2402q to 2402r, respectively.

The flexible body 1040q exhibits a state obtained by slightly bending the flexible body 1040r. Thus, when the points 2401q and 2401r are compared with each other, the former is bent more sharply than the latter. Thus, following Expression (7) is established.

$$q1 > r1 \quad (7)$$

With respect to the points 2402q and 2402r, similarly, $$q2 > r2 \quad (8)$$

is established. The longer a distance from the first end 1041 is, the more deviation the flexible body 1040q and the flexible body 1040r have. Accordingly, Expression (9) is established.

$$q2 - r2 > q1 - r2 \quad (9)$$

When (r2−q1) is added to each of both the sides of Expression (9), Expression (10) is established.

$$q2 - q1 > r2 - r1 \quad (10)$$

In Expression (10), q2−q1 is an angle between tangent lines of the flexible body 1040 at two points (point 2401$q$ and point 2402$q$) on the flexible body 1040$q$. r2−r1 is an angle defined by the same manner as described above. Since the flexible body 1040$q$ is bent more sharply than the flexible body 1040$r$, Expression (10) shows that "when an angle between the tangent lines of the flexible body 1040 at two points (point 2401 and point 2402) on the flexible body 1040 is large, the flexible body 1040 is bent more sharply.".

Since the normal line and the tangent line are orthogonal to each other, similarly, it is established that "when an angle between normal lines of the flexible body 1040 at the two points (point 2401 and point 2402) on the flexible body 1040 is larger, the flexible body 1040 is bent more sharply."

<Eleventh Modification>

Figure 26:
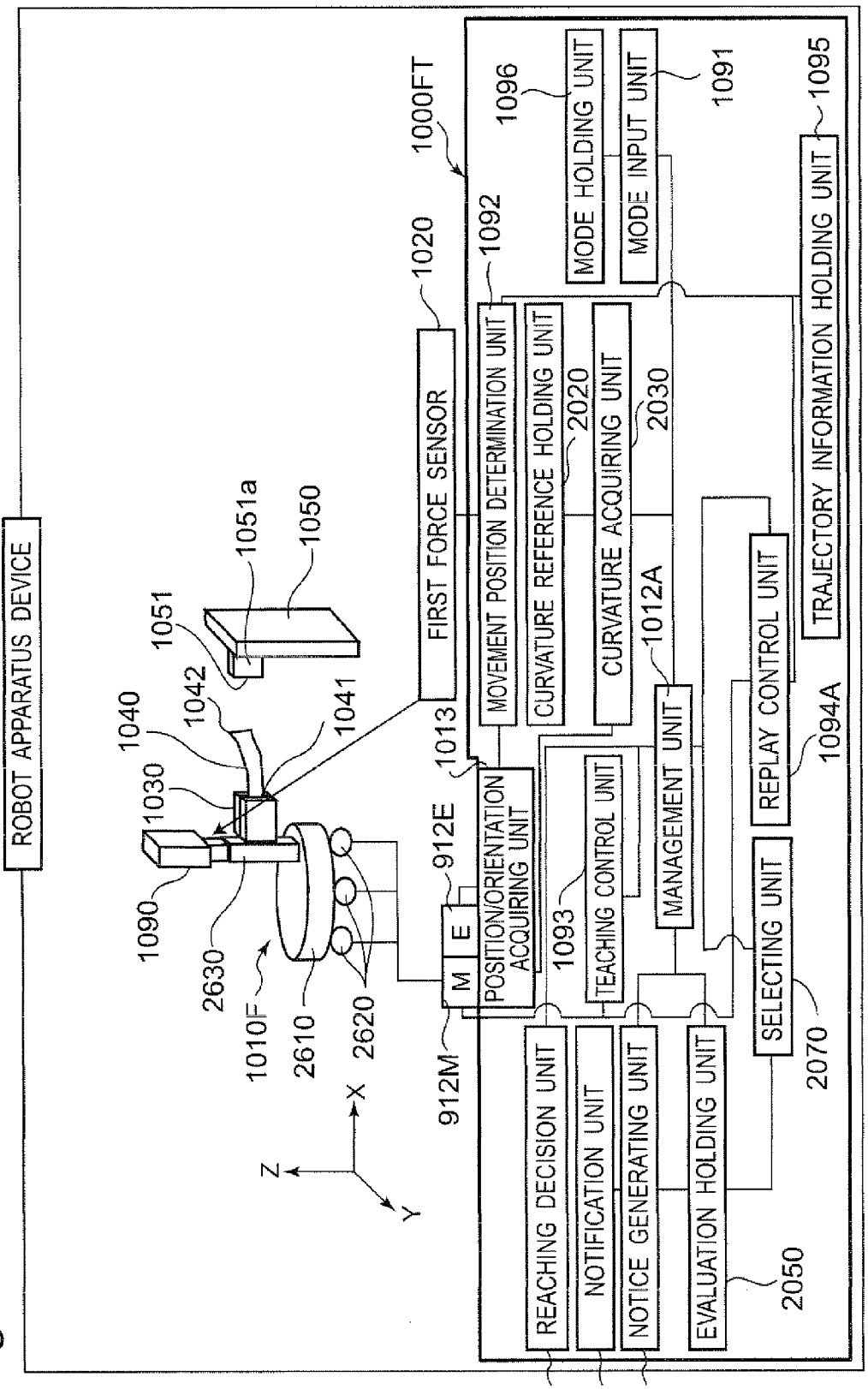
FIG. 26 is a view for explaining a robot apparatus including an omnidirectional mobile robot in an eleventh modification of the first embodiment of the present disclosure.

In the first embodiment, the configuration in which the robot apparatus 1000A includes the robot arm 1010A has been described. However, the robot apparatus 1000A may include another robot. FIG. 26 is a view for explaining a robot apparatus 1000F including an omnidirectional mobile robot 1010F and a teaching device 1000FT. An omnidirectional mobile robot is described in Non-Patent Literature 1 and Non-Patent Literature 2, for example.

In the robot 1010F, a plurality of wheels 2620 that are rotatably located on a lower-surface side and driven forward or backward by the motors 912M and a pole 2630 fixed on an upper surface side are attached to a disk-like table 2610. A package can be placed on the upper surface of the table 2610 of the robot 1010F.

To the pole 2630, the first force sensor 1020 located at the upper end of the pole 2630 and the fixing portion 1030 fixed to the outer side surface of the pole 2630 are attached. The operation portion 1090 is attached to the upper end of the first force sensor 1020.

The cylindrical peripheral portion 1051$a$ having the insertion opening 1051 is attached to the thing 1050. A concrete example of the thing 1050 is an architectural door. The insertion opening 1051 is an insertion opening into which a card key to open/close the door is inserted. The fixing portion 1030 is attached at the same level as that of the insertion opening 1051. The flexible body 1040 is attached to the fixing portion 1030. A concrete example of the flexible body 1040 is the card key described above. The other configurations are the same as those in the first embodiment, and a description thereof will be omitted.

The present disclosure has been described on the basis of the first embodiment and the modifications. However, the present disclosure is not limited to the first embodiment and the modifications as a matter of course. The following cases are included in the present disclosure.

The first embodiment and the modifications explain an example of a flow of processes. However, processes that have no dependence on each other may be executed such that the turns of the processes are replaced with each other, or executed with the processes parallelized.

The method of teaching the robot (method of controlling the teaching device for the robot) mentioned here may be applied together with another method of teaching a robot.

Of the elements constituting the robot arm 1010 and the modification(s) thereof, some or all of the elements except for physical units such as the operation portion 1090, the fixing portion 1030, the arm tip 1011, the motors 912M, and the first force sensor 1020 can be achieved by a computer system including a microprocessor, a ROM, a RAM, a hard disk unit, a display unit, a keyboard, a mouse, and the like. A computer program is stored in the RAM or the hard disk unit. More specifically, when the microprocessor operates in accordance with a computer program, the units achieve the functions thereof. The computer program is configured by combining a plurality of instruction codes representing commands for a computer to each other to achieve predetermined functions.

Of the elements constituting the robot arm 1010 and the modification(s) thereof, some or all of the elements except for the operation portion 1090, the fixing portion 1030, and the arm tip 1011 may be configured by one system LSI (Large Scale Integration: large-scale integrated circuit). The system LSI is a super-multifunctional LSI manufactured by integrating a plurality of constituent units on one chip, and, more specifically, a computer system including a microprocessor, a ROM, a RAM, and the like. A computer program is stored in the RAM. More specifically, when the microprocessor operates in accordance with a computer program, the system LSI achieves the functions thereof.

Of the elements constituting the robot arm 1010 and the modification(s) thereof, some or all of the elements except for the operation portion 1090, the fixing portion 1030, and the arm tip 1011 may be configured by a detachable IC card or a single module for the devices. The IC card or the module is a computer system configured by a microprocessor, a ROM, a RAM, and the like. The IC card or the module may include the super-multifunctional LSI. More specifically, when the microprocessor operates in accordance with a computer program, the IC card or the module achieves the functions thereof. The IC card or the module may have tamper resistance.

Of the elements constituting the robot arm 1010 and the modification(s) thereof, some or all of the elements except for the operation portion 1090, the fixing portion 1030, and the arm tip 1011 may be achieved as a method of generating teaching data for robot. The present disclosure is also achieved as a computer program that causes a computer to generate teaching data by the above methods or digital signals including the computer program.

Of elements constituting the robot arm 1010 and the modification(s) thereof, some or all of the elements except for the operation portion 1090, the fixing portion 1030, and the arm tip 1011 may be executed by downloading the element from a server or the like. The present disclosure can also be achieved as a computer readable recording medium, for example, a flexible disk, a hard disk, a CD-ROM, an MO, a DVD, a DVD-ROM, a DVD-RAM, a BD (Blu-ray Disc), a semiconductor memory, or the like on which the computer program or the digital signals described above are recorded. The present disclosure can also be achieved as digital signals recorded on these recording media.

Of the elements constituting the robot arm 1010 and the modification(s) thereof, some or all of the elements except for the operation portion 1090, the fixing portion 1030, and the arm tip 1011 are also achieved as the above-mentioned computer program or digital signals transmitted through a telecommunication network, a wireless communication network, a cable communication network, a network typified by the Internet, data broadcasting, or the like.

Of the elements constituting the robot arm 1010 and the modification(s) thereof, some or all of the elements except for the operation portion 1090, the fixing portion 1030, and the arm tip 1011 may be achieved as a computer system including a microprocessor and a memory. In this case, the memory stores the computer program described above, and the microprocessor operates in accordance with the computer program.

A different independent computer system may execute the processes of the present disclosure by recording the computer program or the digital signals into a recording medium to transfer the medium or by transferring the computer program or the digital signals via the network.

As one example of the computer program, each component thereof can be implemented as a result that a program executing section (part/unit) such as a CPU reads and executes software programs recorded in a recording medium such as a hard disk or semiconductor memory. Here, software that implements a part or entirety of the robot apparatuses according to each of the above-mentioned embodiments or modifications is a following program. That is to say, this program is a control program of a teaching device for robot comprising a flexible body holding unit capable of holding a flexible body, and a drive unit that moves the flexible body holding unit in a predetermined direction to perform a fitting task of the flexible body to a thing, in which teaching data are generated through teaching of the task, the control program causing a computer to function as:

a reaching decision unit that decides that a front end of the flexible body reaches the thing;

a curvature acquiring unit that acquires information of evaluation of a degree of curvature of the flexible body when the reaching decision unit decides that the front end of the flexible body reaches the thing; and a notification unit that performs notification about teaching based on the information of evaluation acquired by the curvature acquiring unit.

Alternatively, this program is a control program of a teaching device for robot comprising a flexible body holding unit capable of holding a flexible body, and a drive unit that moves the flexible body holding unit in a predetermined direction to perform a fitting task of the flexible body to a thing, in which teaching data are generated through teaching of the task, the control program causing a computer to function as:

a reaching decision unit that decides that a front end of the flexible body reaches the thing;

a curvature acquiring unit that acquires information of evaluation of a degree of curvature of the flexible body when the reaching decision unit decides that the front end of the flexible body reaches the thing; and a selecting unit that selects teaching data having high evaluation from a plurality of teaching data based on the information of evaluation acquired by the curvature acquiring unit.

Further, one or more computers can be used to execute the program. That is, centralized processing or distributed processing can be performed.

By properly combining the arbitrary embodiment(s) or modification(s) of the aforementioned various embodiments and modifications, the effects possessed by the embodiment(s) or modification(s) can be produced.

The entire disclosure of Japanese Patent Application No 2011-262048 filed on Nov. 30, 2011, including specification, claims, drawings, and summary are incorporated herein by reference in its entirety.

INDUSTRIAL APPLICABILITY

A teaching device for robot, a robot apparatus, a method of controlling a teaching device for robot, a control program of a teaching device for robot according to the present disclosure are useful as a teaching device for robot, a robot apparatus, a method of controlling a teaching device for robot, and a control program of a teaching device for robot that perform a task of replaying an inserting task on the basis of teaching data used to insert a flexible body into an insertion opening of a thing. The present disclosure may be applied to a teaching device for robot, a robot apparatus, a method of controlling a teaching device for robot, and a control program of a teaching device for robot that perform not only insertion of a flexible body but also a task of moving a front end of a flexible body to a desired position.

Although the present disclosure has been fully described in connection with the embodiments thereof with reference to the accompanying drawings, it is to be noted that various changes and modifications are apparent to those skilled in the art. Such changes and modifications are to be understood as included within the scope of the present disclosure as defined by the appended claims unless they depart therefrom.

The invention claimed is:

1. A teaching device for a robot comprising a flexible body holding unit capable of holding a flexible body and a drive unit that moves the flexible body holding unit in a predetermined direction to perform a fitting task of the flexible body to an object, in which teaching data is generated through teaching of the fitting task, the teaching device comprising:

a reaching decision unit that decides that a front end of the flexible body reaches the object;

a curvature acquiring unit that acquires information of evaluation of a degree of curvature of the flexible body when the reaching decision unit decides that the front end of the flexible body reaches the object; and a notification unit that performs notification about the teaching based on the information of evaluation acquired by the curvature acquiring unit.

2. The teaching device for the robot according to claim 1, wherein the notification unit performs notification to bend the flexible body to a degree of curvature greater than the degree of curvature of the flexible body before the notification.

3. A teaching device for a robot comprising a flexible body holding unit capable of holding a flexible body and a drive unit that moves the flexible body holding unit in a predetermined direction to perform a fitting task of the flexible body to an object, in which a plurality of teaching data is generated through teaching of the fitting task, comprising:

a reaching decision unit that decides that a front end of the flexible body reaches the object;

a curvature acquiring unit that acquires information of evaluation of a degree of curvature of the flexible body when the reaching decision unit decides that the front end of the flexible body reaches the object; and a selecting unit that selects teaching data having an evaluation ranked higher than other evaluations from the plurality of teaching data based on the information of evaluation acquired by the curvature acquiring unit.

4. The teaching device for the robot according to claim 3, wherein, when the teaching data having the higher ranked evaluation is selected, the selecting unit selects the higher ranked evaluation over the other evaluations as the evaluation of the degree of curvature of the flexible body.

5. The teaching device for the robot according to claim 1, wherein the curvature acquiring unit acquires the information of evaluation of the degree of curvature based on an angle between directions of the flexible body at two points of the flexible body.

6. The teaching device for the robot according to claim 1, further comprising:

a curvature reference holding unit that stores information of a direction of a hole of an insertion opening of the object in fitting of the flexible body to the object; and a position/orientation acquiring unit that acquires information of a direction of the flexible body at one point, wherein the curvature acquiring unit acquires the information of evaluation based on the information of the direction of the hole of the insertion opening stored in the curvature reference holding unit and the information of the direction of the flexible body at one point acquired by the position/orientation acquiring unit.

7. The teaching device for the robot according to claim 1, further comprising
a force sensor that acquires a force acting on the flexible body, wherein
the reaching decision unit performs the decision based on the force acquired by the force sensor.

8. The teaching device for the robot according to claim 5, further comprising:
a photographing device that photographs the flexible body; and
a position acquiring unit that performs image processing to an image photographed by the photographing device to acquire positions of the two points of the flexible body,
wherein the curvature acquiring unit, based on the positions of the two points acquired by the position acquiring unit, acquires a direction of the flexible body at at least one point on the flexible body to acquire the information of evaluation of the degree of curvature of the flexible body based on the acquired direction of the flexible body.

9. The teaching device for the robot according to claim 1, further comprising:
a photographing device that photographs the flexible body; and
a characteristic point extracting unit that performs image processing to an image photographed by the photographing device to extract the front end of the flexible body based on a characteristic point of the front end of the flexible body, wherein the reaching decision unit decides the reaching depending on whether the characteristic point extracting unit extracts the front end of the flexible body.

10. The teaching device for the robot according to claim 1, further comprising
an evaluation holding unit that holds the information of evaluation acquired by the curvature acquiring unit when the teaching of the fitting task is performed a plurality of times and the reaching decision unit decides reaching in each of the teachings of the fitting task,
wherein the notification unit notifies of a first predetermined number of evaluated values larger than other evaluated values or a variance of the first predetermined number of evaluated values of information of a plurality of evaluations held by the evaluation holding unit.

11. The teaching device for the robot according to claim 1, further comprising:
an evaluation holding unit that holds the information of evaluation acquired by the curvature acquiring unit when the teaching of the fitting task is performed a plurality of times and the reaching decision unit decides reaching in each of the teachings of the fitting task; and
a teaching decision unit that decides whether the teaching is continued based on evaluated values of a predetermined number of evaluated values larger than other evaluated values of information of a plurality of evaluations held by the evaluation holding unit.

12. The teaching device for the robot according to claim 1, wherein the robot is a robot arm, and the drive unit is a joint drive unit that drives joint portions of the robot arm.

13. A robot apparatus comprising:
the teaching device for the robot according to claim 1; and
a replay control unit that replays with the robot a trajectory taught by the teaching device.

14. A robot apparatus comprising:
the teaching device for the robot according to claim 1, the teaching device further comprising an evaluation holding unit that holds the information of evaluation acquired by the curvature acquiring unit when the teaching of the fitting task is performed a plurality of times and the reaching decision unit decides reaching in each of the teachings of the fitting task; and
a replay control unit that replays with the robot a trajectory taught by the teaching device, wherein
the replay control unit replays teaching data generated when teaching data having an evaluated value larger than other evaluated values is performed in information of a plurality of evaluations held by the evaluation holding unit.

15. A robot apparatus comprising:
the teaching device for the robot according to claim 1, the teaching device further comprising an evaluation holding unit that holds the information of evaluation acquired by the curvature acquiring unit when the teaching of the fitting task is performed a plurality of times and the reaching decision unit decides reaching in each of the teachings of the fitting task; and
a replay control unit that replays with the robot a trajectory taught by the teaching device, wherein
the replay control unit replays teaching data generated by averaging a predetermined number of teaching data having evaluated values larger than other evaluated values in information of a plurality of evaluations held by the evaluation holding unit.

16. A method of controlling a teaching device for a robot comprising a flexible body holding unit capable of holding a flexible body, and a drive unit that moves the flexible body holding unit in a predetermined direction to perform a fitting task of the flexible body to an object, in which teaching data is generated through teaching of the fitting task, the method comprising:
causing a reaching decision unit to decide that a front end of the flexible body reaches the object;
causing a curvature acquiring unit to acquire information of evaluation of a degree of curvature of the flexible body when the reaching decision unit decides that the front end of the flexible body reaches the object; and
causing a notification unit to perform predetermined notification about the teaching based on the information of evaluation acquired by the curvature acquiring unit.

17. A method of controlling a teaching device for a robot comprising a flexible body holding unit capable of holding a flexible body, and a drive unit that moves the flexible body holding unit in a predetermined direction to perform a fitting task of the flexible body to an object, in which a plurality of teaching data is generated through teaching of the fitting task, the method comprising:
causing a reaching decision unit to decide that a front end of the flexible body reaches the object;
causing a curvature acquiring unit to acquire information of evaluation of a degree of curvature of the flexible body when the reaching decision unit decides that the front end of the flexible body reaches the object; and
causing a selecting unit to select a teaching data having an evaluation ranked higher than other evaluations from the plurality of teaching data based on the information of evaluation acquired by the curvature acquiring unit.

18. A non-transitory computer-readable recording medium including a control program of a teaching device for a robot comprising a flexible body holding unit capable of holding a flexible body, and a drive unit that moves the flexible body holding unit in a predetermined direction to perform a fitting task of the flexible body to an object, in which teaching data is generated through teaching of the fitting task, the control program causing a computer to function as:
- a reaching decision unit that decides that a front end of the flexible body reaches the object;
- a curvature acquiring unit that acquires information of evaluation of a degree of curvature of the flexible body when the reaching decision unit decides that the front end of the flexible body reaches the object; and
- a notification unit that performs notification about the teaching based on the information of evaluation acquired by the curvature acquiring unit.

19. A non-transitory computer-readable recording medium including a control program of a teaching device for a robot comprising a flexible body holding unit capable of holding a flexible body, and a drive unit that moves the flexible body holding unit in a predetermined direction to perform a fitting task of the flexible body to an object, in which a plurality of teaching data is generated through teaching of the fitting task, the control program causing a computer to function as:
- a reaching decision unit that decides that a front end of the flexible body reaches the object;
- a curvature acquiring unit that acquires information of evaluation of a degree of curvature of the flexible body when the reaching decision unit decides that the front end of the flexible body reaches the object; and
- a selecting unit that selects teaching data having an evaluation ranked higher than other evaluations from the plurality of teaching data based on the information of evaluation acquired by the curvature acquiring unit.

20. A teaching device for a robot comprising a flexible body holding unit capable of holding a flexible body, and a drive unit that moves the flexible body holding unit in a predetermined direction to perform a fitting task of the flexible body to an object, in which teaching data is generated through teaching of the fitting task, the device comprising:
- a reaching decision unit that decides that a front end of the flexible body reaches the object;
- an orientation acquiring unit that acquires an orientation of the flexible body holding unit;
- a curvature acquiring unit that acquires an angle between a direction of the orientation acquired by the orientation acquiring unit and a predetermined direction determined in advance; and
- a notification unit that performs notification about the teaching based on the angle acquired by the curvature acquiring unit.

21. A teaching device for a robot comprising a flexible body holding unit capable of holding a flexible body and a drive unit that moves the flexible body holding unit in a predetermined direction to perform a fitting task of the flexible body to an object, in which a plurality of teaching data is generated through teaching of the fitting task, the device comprising:
- an orientation acquiring unit that acquires an orientation of the flexible body holding unit;
- a curvature acquiring unit that acquires an angle between a direction of the orientation acquired by the orientation acquiring unit and a predetermined direction determined in advance; and
- a selecting unit that selects teaching data having an evaluation ranked higher than other evaluations from the plurality of teaching data based on the angle acquired by the curvature acquiring unit.

* * * * *